United States Patent
Rodney et al.

(10) Patent No.: US 9,234,981 B2
(45) Date of Patent: Jan. 12, 2016

(54) EXPLOITATION OF SEA FLOOR RIG STRUCTURES TO ENHANCE MEASUREMENT WHILE DRILLING TELEMETRY DATA

(75) Inventors: Paul F. Rodney, Spring, TX (US);
Andrew J. Downing, Tomball, TX (US);
Ronald L. Spross, Humble, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 594 days.

(21) Appl. No.: 13/388,181

(22) PCT Filed: Jul. 21, 2010

(86) PCT No.: PCT/US2010/042691
§ 371 (c)(1),
(2), (4) Date: Jan. 31, 2012

(87) PCT Pub. No.: WO2011/014389
PCT Pub. Date: Feb. 3, 2011

(65) Prior Publication Data
US 2012/0126992 A1    May 24, 2012

Related U.S. Application Data

(60) Provisional application No. 61/230,151, filed on Jul. 31, 2009.

(51) Int. Cl.
*H04B 13/02* (2006.01)
*G01V 11/00* (2006.01)
(Continued)

(52) U.S. Cl.
CPC .......... *G01V 11/002* (2013.01); *E21B 33/0355* (2013.01); *E21B 34/10* (2013.01)

(58) Field of Classification Search
CPC ...................................... G01V 11/002
USPC ................ 340/856.3, 854.8, 854.6; 166/299, 166/308.1
See application file for complete search history.

(56) References Cited

U.S. PATENT DOCUMENTS

| 4,147,222 A | * | 4/1979 | Patten et al. .............. 175/9 |
| 4,590,593 A |   | 5/1986 | Rodney |

(Continued)

FOREIGN PATENT DOCUMENTS

| WO | 2008-133633 | 11/2008 |
| WO | 2010-014095 | 2/2010 |
| WO | 2011-008201 | 1/2011 |

OTHER PUBLICATIONS

International Search Report and Written Opinion issued Feb. 24, 2011 in PCT Application No. PCT/US2010/042691.

*Primary Examiner* — Fekadeselassie Girma
*Assistant Examiner* — Chico A Foxx

(57) ABSTRACT

A method for communicating data in an offshore data communication system comprises measuring L/MWD data with a sensor disposed in a bottomhole assembly positioned in a subsea borehole. The bottomhole assembly is disposed along a drillstring extending through the subsea borehole. In addition, the method comprises communicating the L/MWD data from the bottomhole assembly to the seafloor with a telemetry signal. Further, the method comprises receiving the telemetry signal with at least one telemetry transducer positioned proximal the sea floor. Still further, the method comprises processing the telemetry signal at the seafloor to produce a processed signal. Moreover, the method comprises transmitting the processed signal from the sea floor to the sea surface.

24 Claims, 17 Drawing Sheets

(51) Int. Cl.
*E21B 33/035* (2006.01)
*E21B 34/10* (2006.01)

(56) References Cited

U.S. PATENT DOCUMENTS

| | | | |
|---|---|---|---|
| 4,639,729 A * | 1/1987 | Savit | 340/870.13 |
| 4,839,873 A * | 6/1989 | Cochrane et al. | 367/133 |
| 4,924,949 A * | 5/1990 | Curlett | 175/25 |
| 5,684,882 A * | 11/1997 | Mahieux et al. | 381/92 |
| 5,917,325 A * | 6/1999 | Smith | 324/326 |
| 5,959,548 A | 9/1999 | Smith | |
| 6,018,501 A * | 1/2000 | Smith et al. | 367/134 |
| 6,144,316 A * | 11/2000 | Skinner | 340/853.7 |
| 6,177,882 B1 | 1/2001 | Ringgenberg et al. | |
| 6,657,597 B2 * | 12/2003 | Rodney et al. | 343/719 |
| 6,741,185 B2 | 5/2004 | Shi et al. | |
| 6,781,520 B1 | 8/2004 | Smith et al. | |
| 6,781,521 B1 | 8/2004 | Gardner et al. | |
| 7,123,162 B2 * | 10/2006 | Mackenzie et al. | 340/854.7 |
| 7,170,423 B2 | 1/2007 | Wisler et al. | |
| 7,389,183 B2 * | 6/2008 | Gray | 702/6 |
| 7,931,090 B2 * | 4/2011 | Smedstad et al. | 166/366 |
| 8,540,027 B2 * | 9/2013 | Wesson et al. | 166/298 |
| 2003/0025639 A1 * | 2/2003 | Rodney et al. | 343/719 |
| 2004/0004553 A1 * | 1/2004 | Rodney | 340/853.3 |
| 2004/0155794 A1 | 8/2004 | Gardner | |
| 2006/0124352 A1 * | 6/2006 | Krueger et al. | 175/25 |
| 2006/0283632 A1 * | 12/2006 | Hall et al. | 175/26 |
| 2007/0223822 A1 * | 9/2007 | Haugland | 382/232 |
| 2011/0187553 A1 * | 8/2011 | Rodney | 340/852 |

* cited by examiner

EXPLOITATION OF SEA FLOOR RIG STRUCTURES TO ENHANCE MEASUREMENT WHILE DRILLING TELEMETRY DATA

STATEMENT REGARDING FEDERALLY SPONSORED RESEARCH OR DEVELOPMENT

Not applicable.

BACKGROUND

1. Field of the Invention

The invention relates generally to subsea data communications systems and methods. More particularly, the invention relates to a subsea data telemetry systems and methods that leverage sea floor rig structures to enhance the quality of the telemetry data.

2. Background of the Technology

Modern petroleum drilling and production operations demand a great quantity of data and information relating to downhole conditions and drilling and production parameters. Such information typically includes characteristics of the earth formations traversed by the wellbore, as well as data relating to the size and configuration of the borehole itself. The collection of information relating to downhole conditions, commonly referred to as "logging", can be performed by a variety of methods.

In conventional oil well wireline logging, a probe or "sonde" that houses formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. The instrumentation in the sonde communicates information to the surface by electrical signals transmitted through the wireline.

One problem with obtaining downhole measurements via wireline is that the drilling assembly must be removed or "tripped" from the drilled borehole before the wireline can be lowered downhole to obtain the desired borehole information. This can be both time-consuming and extremely costly, especially in situations where a substantial portion of the well has been drilled. For example, thousands of feet of tubing may need to be removed and stacked on the platform. Typically, drilling rigs are rented by the day at a substantial cost. Consequently, the cost of drilling a well is directly proportional to the time required to complete the drilling process. Removing thousands of feet of tubing to insert a wireline logging tool is often an expensive proposition.

As a result, there has been an increased emphasis in recent years on the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well are generally referred to as "measurement-while-drilling" techniques, or "MWD." Similar techniques, concentrating more on the measurement of formation parameters, are generally referred to as "logging while drilling" techniques, or "LWD." While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

When oil wells or other boreholes are being drilled, it is frequently necessary or desirable to determine the direction and inclination of the drill bit and downhole motor so that the assembly can be steered in the desired direction. Additionally, information may be required concerning the nature of the strata being drilled, such as the formation's resistivity, porosity, density, and its measure of gamma radiation. It is also frequently desirable to know other downhole parameters, such as the temperature and the pressure at the base of the borehole. Once this data is gathered at the bottom of the borehole, it is necessary to communicate it to the surface for use and analysis by the driller.

Most conventional offshore MWD systems include sensors or transducers located at the lower end of the drill string and a receiver or detector located at the sea surface. Typically, the downhole sensors employed in MWD applications are positioned in a cylindrical drill collar that is positioned close to the drill bit. While drilling is in progress, the sensors continuously or intermittently monitor drilling parameters and formation data and transmit the information to the surface detector by some form of telemetry. Thus, in the telemetry system, data acquired by the sensors is transmitted from the borehole bottom to the receiver located on the surface.

There are a number of known telemetry systems that transmit information regarding downhole parameters to the surface without requiring the use of a wireline tool. Of these, mud pulse systems are one of the most widely used telemetry systems for MWD applications. Other forms of telemetry include electromagnetic (EM) telemetry and acoustic telemetry. However, offshore MWD operations pose numerous difficulties to conventional mud pulse, acoustic, and EM telemetry systems and methods and often impose undesirable limitations on data transfer rates and/or depth ranges.

Accordingly, there remains a need in the art for improved systems and methods for communicating MWD and LWD data in offshore applications. Such systems and methods would be particularly well received if they offered the potential to increase data transmission rates between the borehole bottom and the surface and/or enhance data quality.

BRIEF SUMMARY OF THE DISCLOSURE

These and other needs in the art are addressed in one embodiment by a method for communicating data in an offshore data communication system. In an embodiment, the method comprises measuring L/MWD data with a sensor disposed in a bottomhole assembly positioned in a subsea borehole. The bottomhole assembly is disposed along a drillstring extending through the subsea borehole. In addition, the method comprises communicating the L/MWD data from the bottomhole assembly to the seafloor with a telemetry signal. Further, the method comprises a receiving the telemetry signal with at least one telemetry transducer positioned proximal the sea floor. Still further, the method comprises processing the telemetry signal at the seafloor to produce a processed signal. Moreover, the method comprises transmitting the processed signal from the sea floor to the sea surface.

These and other needs in the art are addressed in another embodiment by an offshore drilling system. In an embodiment, the drilling system comprises a drilling platform positioned at the sea surface. In addition, the drilling system comprises a drillstring extending from the drilling platform. The drillstring has a lower end including a bottomhole assembly disposed in a subsea borehole. Further, the drilling system comprises a subsea telemetry communication system including a telemetry transmitter disposed in the bottomhole assembly and a subsea telemetry receiver disposed proximal the sea floor. The telemetry transmitter is adapted to transmit a telemetry signal from the bottomhole assembly to the subsea telemetry receiver. Still further, the drilling system comprises a subsea signal processor positioned proximal the sea floor and coupled to the at least one telemetry receiver. The signal processor is adapted to process the telemetry signal into a processed telemetry signal. Moreover, the drilling system comprises a communication link adapted to communicate the processed telemetry signal to the sea surface. The communication link includes a transmitter disposed proximal the sea floor and a receiver at the sea surface. Further, the transmitter is coupled to the signal processor and communicates the processed signal to the receiver.

These and other needs in the art are addressed in another embodiment by an offshore L/MWD data communication system. In an embodiment, the system comprises a subsea telemetry communication system adapted to transmit a telemetry signal from a bottomhole assembly disposed in a borehole to the sea floor. In addition, the system comprises a communication link adapted to communicate a processed signal between the sea floor and the sea surface. Further, the system comprises a subsea signal processor positioned proximal the sea floor and coupled to the telemetry communication system and the communication link. The signal processor is adapted to receive the telemetry signal and output the processed signal.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

Figure 1:
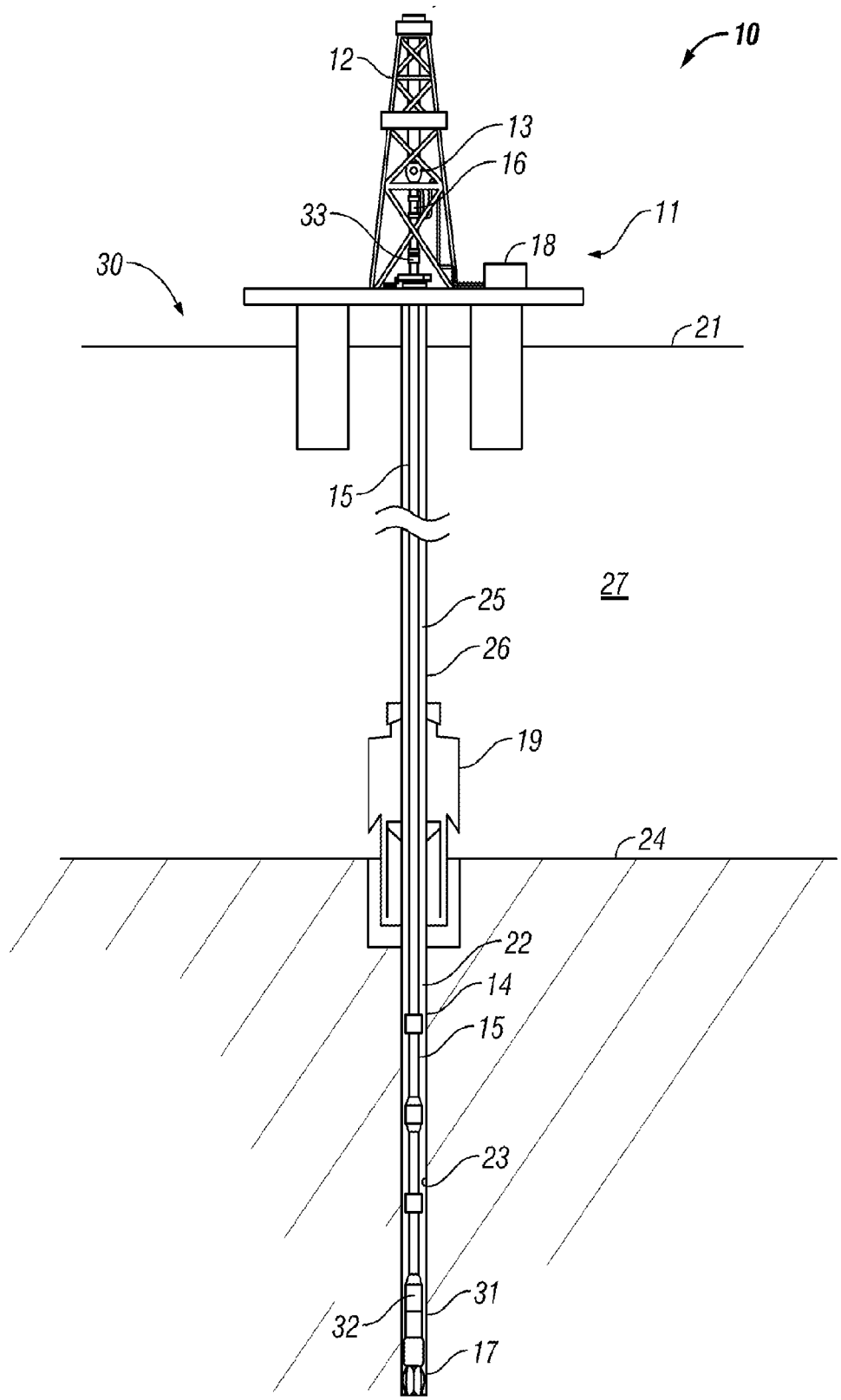
FIG. 1 is a schematic view of a conventional offshore telemetry system.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . . " Also, the term "couple" or "couples" is intended to mean either an indirect or direct physical and/or electrical connection. Thus, if a first device couples to a second device, that connection may be through a direct physical and/or electrical connection, or through an indirect physical and/or electrical connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, a schematic view of an offshore drilling system 10 that employs a conventional offshore L/MWD telemetry system 30 is shown. Drilling system 10 comprises an offshore drilling platform 11 equipped with a derrick 12 that supports a hoist 13. Drilling of oil and gas wells is carried out by a string of drill pipes connected together by "tool" joints 14 so as to form a drill string 15 extending subsea from platform 11. The hoist 13 suspends a kelly 16 used to lower the drill string 15. Connected to the lower end of the drill string 15 is a drill bit 17. The bit 17 is rotated by rotating the drill string 15 and/or a downhole motor (e.g., downhole mud motor). Drilling fluid, also referred to as drilling "mud", is pumped by mud recirculation equipment 18 (e.g., mud pumps, shakers, etc.) disposed on platform 11. The drilling mud is pumped at a relatively high pressure and volume through the drilling kelly 16 and down the drill string 15 to the drill bit 17. The drilling mud exits the drill bit 17 through nozzles or jets in face of the drill bit 17. The mud then returns to the platform 11 at the sea surface 21 via an annulus 22 between the drill string 15 and the borehole 23, through a blowout preventer (BOP) 19 at the sea floor 24, and up an annulus 25 between the drill string 15 and a riser 26 extending through the sea 27 from the blowout preventer 19 to the platform 11. At the sea surface 21, the drilling mud is cleaned and then recirculated by the recirculation equipment 18. The drilling mud is used to cool the drill bit 17, to carry cuttings from the base of the borehole to the platform 11, and to balance the hydrostatic pressure in the rock formations.

In wells employing telemetry for MWD, the telemetry system 30 typically includes downhole sensors 31 coupled to a transmitter 32 that transmits telemetry signals directly from the bottomhole assembly (BHA) to one or more receivers 33 at the sea surface 21. The receivers 33 receive the transmitted telemetry signals from the transmitter 32 and pass the signal along to a signal processor and computer where the signals are decoded, reconstructed, filtered, and/or cleaned. In some cases, one or more repeater modules may be provided along the drill string 15 to receive and retransmit the telemetry signals. The repeater modules typically include both a telemetry receiver and a telemetry transmitter configured similarly to receivers 33 and the transmitter 32, respectively.

For acoustic telemetry communications, transmitter 32 is an acoustic telemetry transmitter that transmits telemetry signals in the form of acoustic vibrations in the tubing wall of drill string 15. In addition, telemetry receivers 33 usually comprise an acoustic telemetry receiver array coupled to the kelly 10 to receive acoustic telemetry signals transmitted by transmitter 32. For mud pulse telemetry communications, transmitter 32 is a valve operated to restrict the flow of the drilling mud down the drill string 15 according to the digital information to be transmitted. This creates pressure fluctuations or pulses that propagate through the drilling fluid in the drill string 15 towards the sea surface 21. Further, telemetry receivers 33 comprise one or more pressure sensors coupled to the stand pipe and/or the pipe between the standpipe and the recirculation equipment 18. Lastly, for electromagnetic (EM) telemetry communications, transmitter 32 is an EM tool that incorporates an electrical insulator in the drillstring 15. To transmit data, the EM tool generates an altered voltage difference between the portion of drillstring 15 above the insulator and the portion of the drillstring 15 below the insulator. At the sea surface 21, one or more wires are coupled to the riser 26, and an array of receivers are disposed in a vertical and/or horizontal arrangement proximal the sea surface 21 some distance away from the drillstring 15. The wires coupled to the riser 26 and the array of receivers form the two electrodes of a dipole antenna. The voltage difference between the two electrodes is the received signal decoded by a computer. Thus, in most conventional offshore telemetry systems (e.g., telemetry system 30), the telemetry signal, whether acoustic, pressure pulse, or EM, is transmitted from the bottomhole assembly across the sea floor 24 and through the sea 27 to the platform 11 at the sea surface 21. In other words, for conventional offshore acoustic telemetry systems, the acoustic telemetry signal is communicated directly from the bottomhole assembly to the sea surface; for conventional offshore mud pulse telemetry systems, the pressure pulse is communicated directly from the bottomhole assembly to the sea surface; and for conventional offshore EM telemetry systems, the EM signal is communicated directly from the bottomhole assembly to the sea surface.

Figure 2:
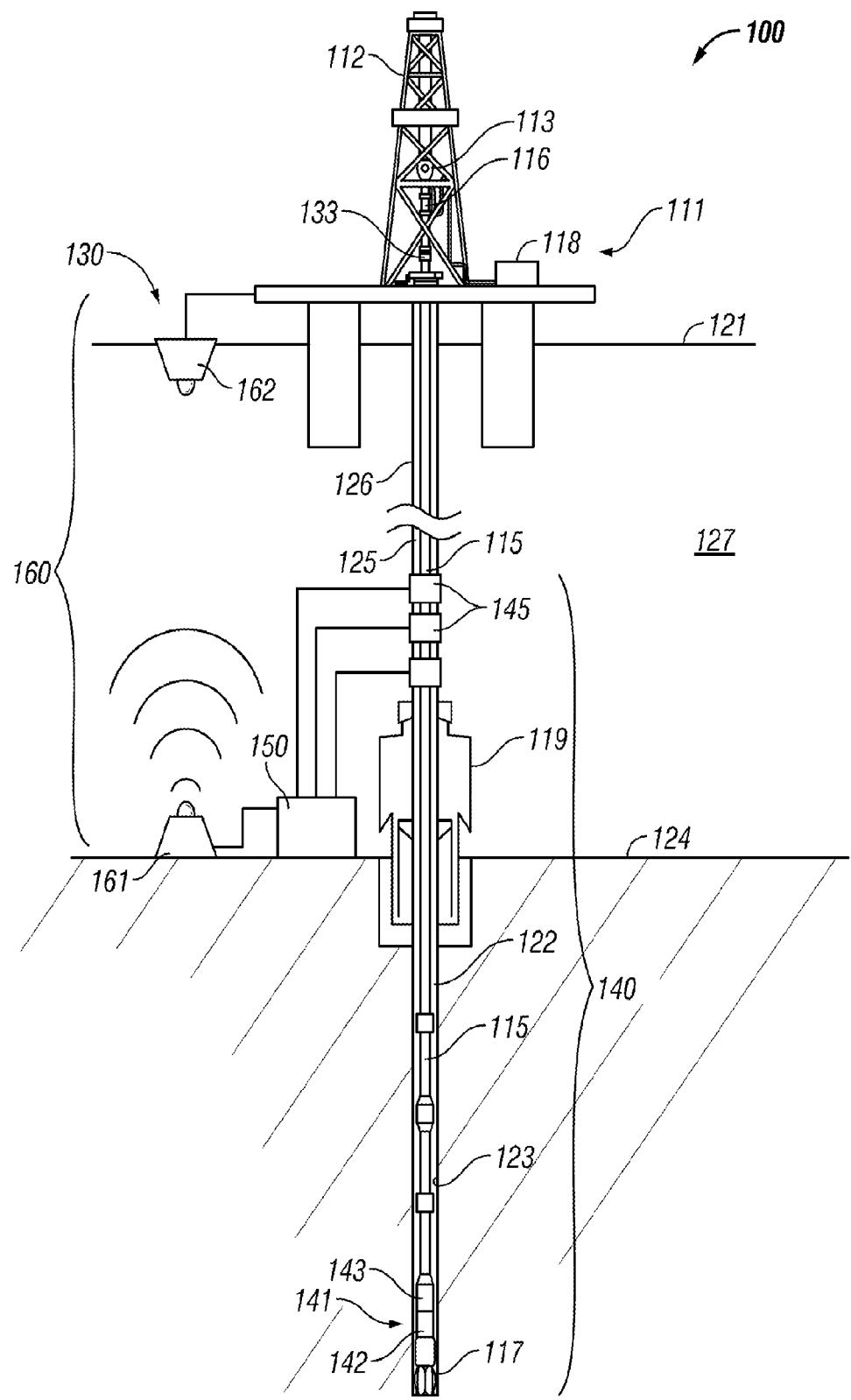
FIG. 2 is a schematic view of an offshore drilling system including an embodiment of an offshore L/MWD data communication system in accordance with the principles described herein.

Referring now to FIG. 2, a schematic view of an offshore drilling system 100 including an embodiment of an offshore L/MWD data communication system 130 in accordance with the principles described herein is shown. Similar to drilling system 10 previously described, drilling system 100 includes an offshore drilling platform 111 equipped with a derrick 141 that supports a hoist 113 and a drillstring 115 extending subsea from platform 111. The hoist 113 suspends a kelly 116 used to lower the drill string 115. Connected to the lower end of the drill string 115 is a drill bit 117. The bit 117 may be rotated by rotating the drill string 115 and/or a downhole motor (e.g., downhole mud motor). During drilling operations, drilling fluid is pumped down drillstring 115 with mud recirculation equipment 118 (e.g., mud pumps, shakers, etc.) disposed on platform 111. The drilling mud is pumped at a relatively high pressure and volume through the drilling kelly 116 and down the drill string 115 to the drill bit 117. The drilling mud exits the drill bit 117 through nozzles or jets in face of the drill bit 117. The mud then returns to the platform 111 at the sea surface 142 via the annulus 143 between the drill string 115 and the borehole 123, through a blowout preventer (BOP) 119 at the sea floor 124, and up an annulus 125 between the drill string 115 and a riser 126 extending through the sea 127 from the blowout preventer 119 to the platform 111. At the sea surface 142, the drilling mud is cleaned and then recirculated by the recirculation equipment 118. The drilling mud is used to cool the drill bit 117, to carry cuttings from the base of the borehole to the platform 111, and to balance the hydrostatic pressure in the rock formations.

Unlike drilling system 10 previously described, in this embodiment, drilling system 100 does not include a conventional telemetry system (e.g., telemetry system 30) that communicates data directly from the bottomhole assembly to the sea surface. Rather, in this embodiment, data communication system 130 includes a subsea telemetry communication uplink system 140 that communicates telemetry data from a bottomhole assembly 141 to the sea floor 124, a signal processor 150 that processes the telemetry signals at the sea floor 124, and a sea floor-to-sea surface communication link 160 that communicates the processes telemetry signals from the sea floor 124 to the sea surface 142. As used herein, the terms "processes" and "processing" used with respect to one or more electronic signals refers to the manipulation of the electronic signal(s) including, without limitation, amplifying the signal(s), conditioning the signal(s), filtering the signal(s) (e.g., using digital and/or adaptive filters), phase shifting the signal(s), adding or subtracting multiple signals, digitizing the signal(s), or combinations thereof.

Referring still to FIG. 2, subsea telemetry communication uplink system 140 comprises bottomhole assembly 141 disposed at the lower end of drillstring 115 proximal bit 117 and at least one telemetry transducer or receiver 145 disposed subsea at or proximal the sea floor 24. In this embodiment, a plurality of telemetry receivers 145 are coupled to riser 126 at blowout preventer 119 disposed at the sea floor 124. Although three telemetry transducers 145 are shown in FIG. 2, in general, any suitable number of telemetry receivers (e.g., telemetry receivers 145) may be employed. In addition, although telemetry transducers 145 are shown mounted to riser 116 proximal the blowout preventer 19 in FIG. 2, in general, one or more telemetry transducers (e.g., telemetry transducers 145) may be positioned at any suitable location proximal the sea floor (e.g., sea floor 124) including, without limitation, mounted to the riser (e.g., riser 126), mounted to the blowout preventer (e.g., blowout preventer 119), disposed on the sea floor, or combinations thereof.

Bottomhole assembly 141 includes one or more downhole sensors 142 that measure and detect L/MWD data, and a telemetry signal transmitter 143 that communicates the measured L/MWD data via telemetry signals to telemetry receivers 145. In some embodiments, one or more repeater modules may be provided along drill string 115 between bottomhole assembly 141 and telemetry receivers 145 to receive and retransmit the telemetry signals. In general, each repeater module includes a telemetry receiver and a telemetry transmitter configured similarly to each receiver 145 and transmitter 143, respectively. Thus, telemetry communication uplink system 140 communicates measured L/MWD data, via telemetry signals, through borehole 123 to the sea floor 124. As will be described in more detail below, subsea telemetry system 140 may employ any suitable form of L/MWD telemetry including, without limitation, mud pulse telemetry, EM telemetry, acoustic telemetry, or combinations thereof. The repeater modules, if any, may be capable of converting received L/MWD telemetry signals of one form to another. For example, a repeater module may convert EM telemetry signals to acoustic telemetry signals or mud pulse telemetry signals.

Referring still to FIG. 2, signal processor 150 is disposed at the sea floor 124 allows communication between telemetry communication uplink system 140 and communication link 160. In particular, signal processor 150 receives unprocessed L/MWD telemetry signals from telemetry communication uplink system 140, processes the L/MWD telemetry signals (e.g., conditions the signals, amplifies the signals, filters the signals, etc.), and then communicates the processed telemetry signals to communication link 160. In this embodiment, signal processor 150 is electrically coupled to telemetry communication uplink system 140 and communication link 160, thereby allowing electronic communication of signals from telemetry communication uplink system 140 to communication link 160.

Figure 3:
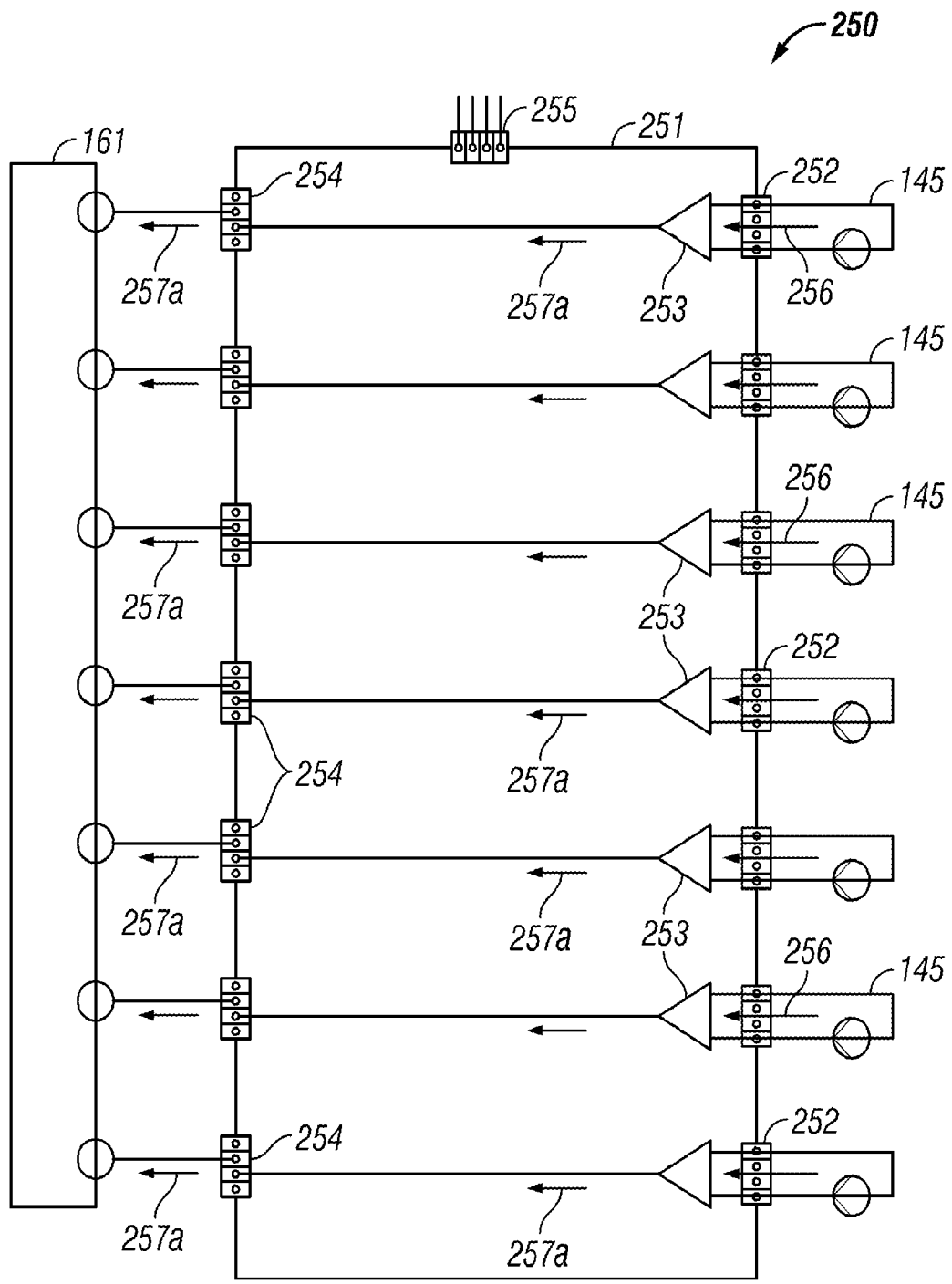
FIG. 3 is a schematic circuit diagram illustrating an embodiment of a signal processor that may be employed in the offshore L/MWD data communication system of FIG. 2.
Figure 4:
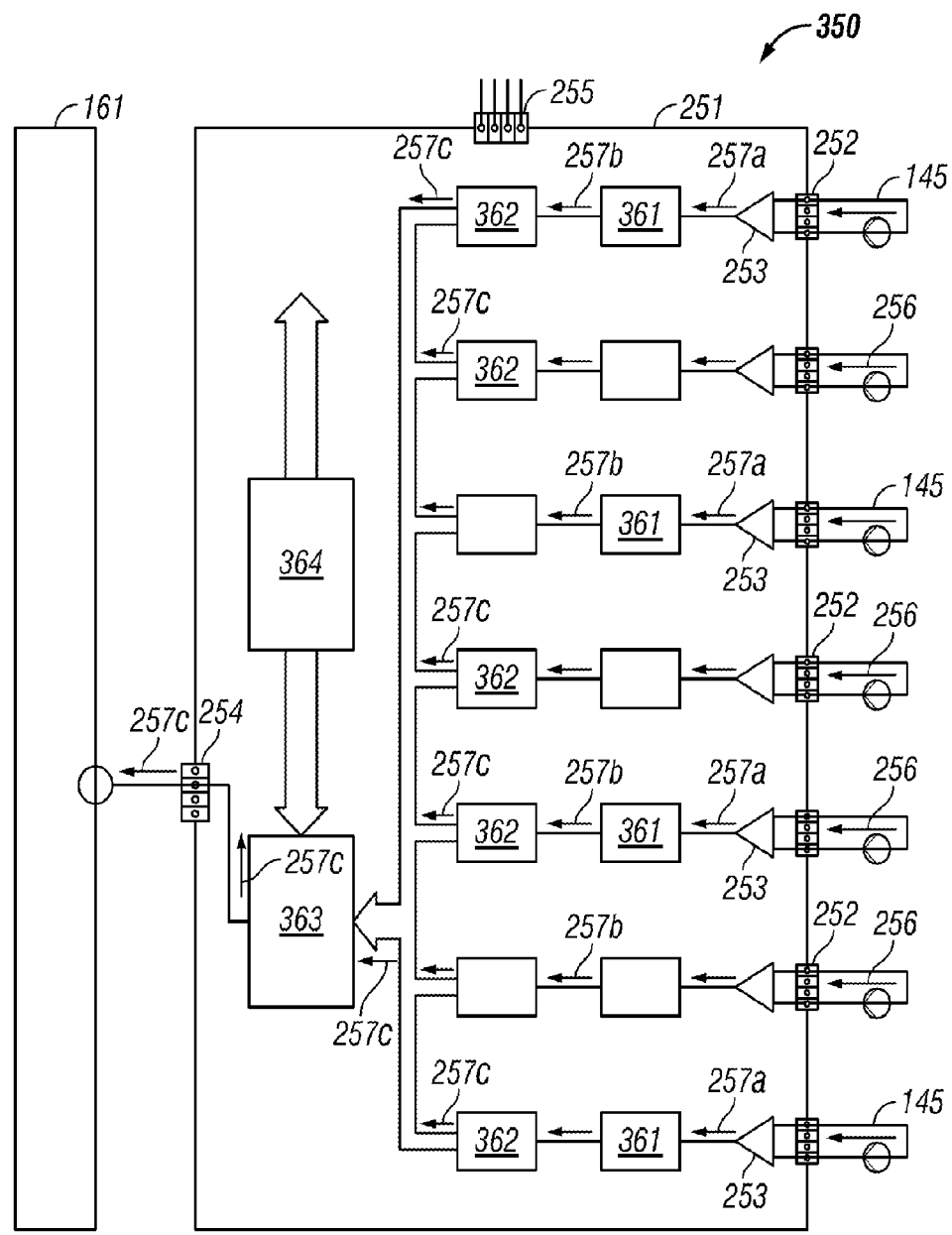
FIG. 4 is a schematic circuit diagram illustrating an embodiment of a signal processor that may be employed in the offshore L/MWD data communication system of FIG. 2.
Figure 5:
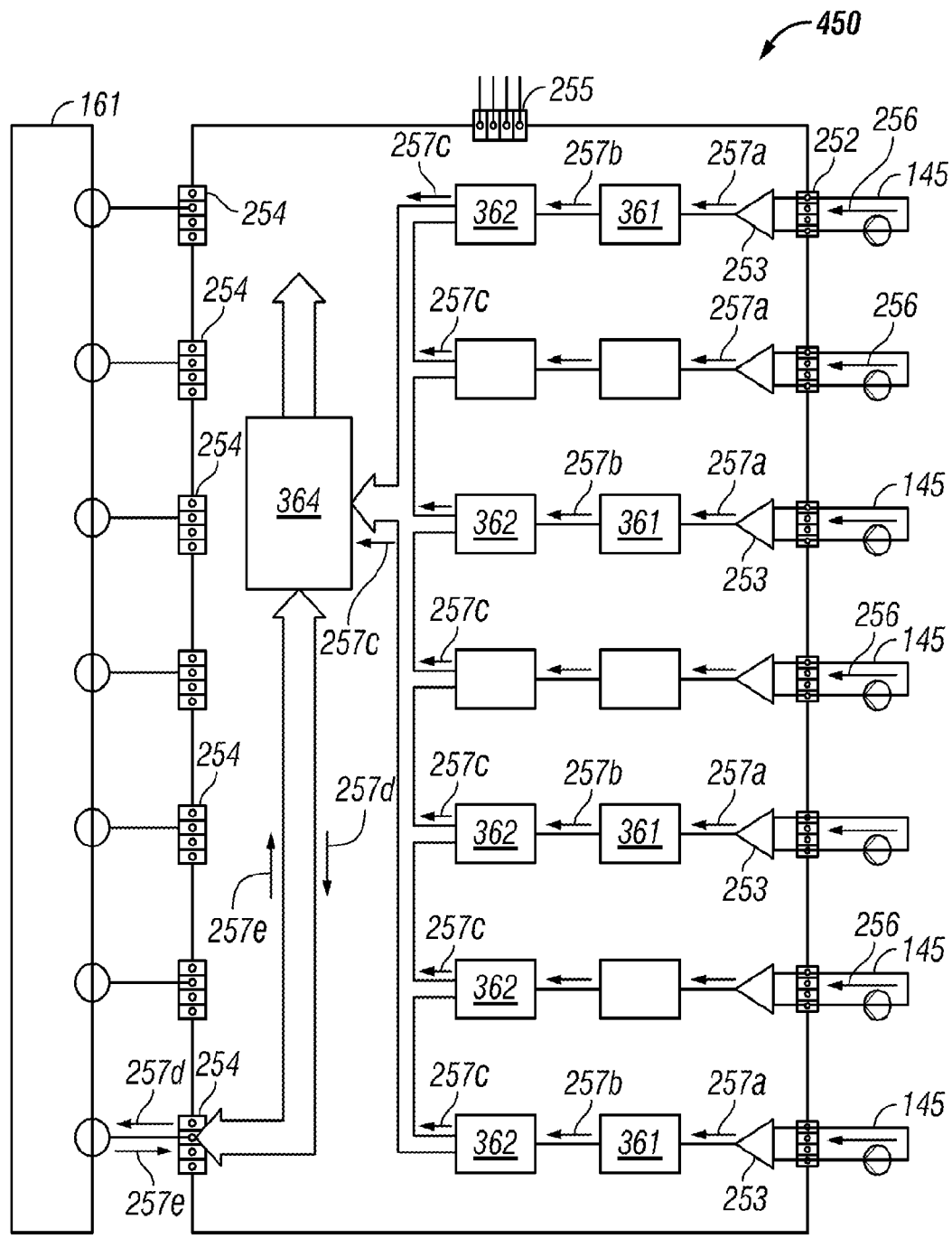
FIG. 5 is a schematic circuit diagram illustrating an embodiment of a signal processor that may be employed in the offshore L/MWD data communication system of FIG. 2.
Figure 6:
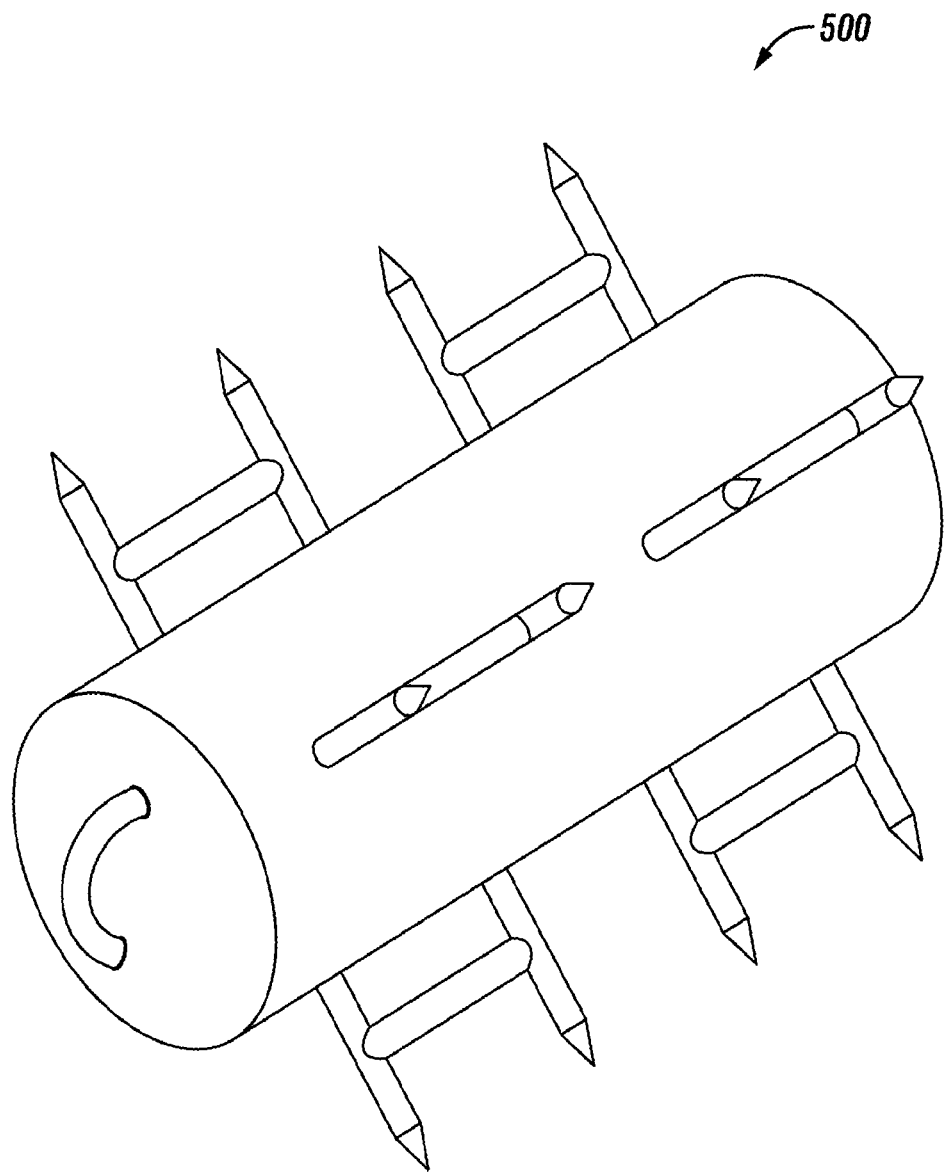
FIG. 6 is a perspective view of an embodiment of an electric field antenna that may be employed as a receiver in the offshore L/MWD data communication system of FIG. 2.

In general, signal processor 150 may take on numerous forms depending on the type of signal processing desired. Exemplary embodiments of signal processor 150 are shown in FIGS. 3-5 and described in more detail below.

Referring still to FIG. 2, communication link 160 receives the processed L/MWD telemetry signals from signal processor 150, and then communicates the processed signals from the sea floor 124, through the sea 127, to the sea surface 21 and offshore platform 11. In this embodiment, communication link 160 comprises an acoustic modem including an acoustic modem transmitter 161 coupled to signal processor 150 at the sea floor 24, and an acoustic modem receiver 162 coupled to offshore rig 102 at the sea surface 21. Acoustic modem transmitter 161 receives the processed L/MWD telemetry signals from signal processor 150 and communicates them through the sea 127 to acoustic modem receiver 162. The L/MWD telemetry signals received at the sea surface 121 by acoustic modem receiver 162 may be decoded and/or processed as appropriate for subsequent analysis of the L/MWD data.

In general, communication link 160 may comprises any suitable acoustic modem capable of communicating L/MWD telemetry signals between the sea floor 124 and the sea surface 121. However, the acoustic modem preferably allows for the transmission of multiple channels of data, thereby enabling the simultaneous communication of multiple L/MWD signals received from multiple sensors (e.g., sensors 142) and/or transducers (e.g., telemetry receivers 145) on separate channels. Examples of suitable acoustic modems include, without limitation, acoustic modems commercially available from LinkQuest Inc. and Teledyne Marine. Such acoustic modems are capable of providing multichannel communications at data rates of several KHz in sea depths on the order of a mile. Other examples of suitable acoustic modems are shown and described in U.S. Pat. No. 6,018,501, which is hereby incorporated herein by reference in its entirety for all purposes. In addition, the acoustic modem preferably has sufficient bandwidth to allow re-transmission of L/MWD the processed telemetry signals received from the signal processor (e.g., processor 150) with little or no signal processing prior to re-transmission, and specifically, without decoding. Some filtering of the uplink telemetry signals may be desirable before retransmission to the sea surface and offshore rig via the acoustic modem.

Although sea floor-to-sea surface communication link 160 has been shown and described as an acoustic modem, in other embodiments, communication link 160 may take on different forms. For example, in other embodiments, communication link 160 may comprises a physical link of wire extending from the sea surface to the sea floor such as the wire that is typically present between the deck of an offshore rig and the BOP, a cable, a fiber optic link, an optical modem, or combinations thereof.

As previously described, signal processor 150 receives unprocessed L/MWD telemetry signals from telemetry receivers 145, processes the signals (e.g., conditions to signals, filters the signals, amplifies the signals, etc.), and then communicates the processed L/MWD signals to communication link 160. Signal processor 150 may take on numerous forms depending on the type of signal processing desired. For example, referring now to FIG. 3, a schematic view of an embodiment of signal processor 250 that may be employed as signal processor 150 of FIG. 2 is shown. In this embodiment, signal processor 250 comprises a pressure housing 251 including a plurality of high pressure feed-through input connectors 252, a plurality of signal conditioning buffer amplifiers 253, a plurality of high pressure feed-through output connectors 254, and an external power input 255 extending through housing 251. In general, an external power supply (not shown) provides the electrical power to power input 255, which then distributes that electrical power to the various components of signal processor 250. For purposes of clarity, the power connections and power distribution lines to the various electronics components internal and external to signal processor 250 are not shown.

Referring still to FIG. 3, in this embodiment, each input connector 252 is coupled to one telemetry receiver 145 previously described, one amplifier 253, and one outlet connector 254. Thus, each input connector 252 places a telemetry receiver 145 in communication with an amplifier 253 within housing 251 and an outlet connector 254. Accordingly, in this embodiment, at least one input connectors 252 is provided for each telemetry receiver 145. Each outlet connector 254 is coupled to communication link transmitter 161 previously described.

Referring now to FIGS. 2 and 3, during drilling operations, telemetry signal transmitter 142 communicates L/MWD telemetry signals to receivers 145. This communication may be accomplished via any suitable form of telemetry including, without limitation, mud pulse telemetry, EM telemetry, acoustic telemetry, or combinations thereof. Telemetry receivers 145 receive the L/MWD telemetry signals and convert the L/MWD telemetry signals into electronic L/MWD telemetry signals represented by arrows 256 in FIG. 3. Prior to processing by signal processor 250, the electronic L/MWD signals 256 are considered raw or unprocessed (i.e., not amplified, conditioned, filtered, etc.). The unprocessed electronic L/MWD signals 256 are communicated from receivers 145 to signal processor 250 via input connectors 252. As best shown in FIG. 3, within signal processor 250, the unprocessed electronic L/MWD telemetry signals 256 are amplified by signal conditioning buffer amplifiers 253, thereby converting the unprocessed electronic L/MWD signals 256 into processed or "amplified" electronic L/MWD telemetry signals represented by arrows 257a. Amplified electronic L/MWD signals 257a from each conditioning buffer amplifier 253 are transmitted to acoustic modem transmitter 161 through an output connector 254. In particular, conditioning buffer amplifiers 253 provide low impedance outputs (e.g., processed electronic L/MWD signals 257a) to drive the inputs to the acoustic modem 161. The amplified telemetry signals 257a communicated to acoustic modem transmitter 161 are retransmitted to acoustic modem receiver 162 and offshore rig 102 for further processing and decoding.

Referring now to FIG. 4, a schematic view of another embodiment of signal processor 350 that may be employed as signal processor 150 of FIG. 2 is shown. Similar to signal processor 250 shown in FIG. 3, in this embodiment, signal processor 350 comprises a pressure housing 251 including a plurality of high pressure feed-through input connectors 252, a plurality of signal conditioning buffer amplifiers 253, and an external power input 255 extending through housing 251. However, in this embodiment, signal processor 250 also includes a plurality of programmable delay lines 361, a plurality of programmable filters 362, a multiplexer 363, and a digital signal processing (DSP) unit or computer 364. As shown in FIG. 4, one buffer amplifier 253, one programmable delay line 361, and one programmable filter 362 is provided for each telemetry receiver 145. Further, in this embodiment, only one high pressure feed-through output connectors 254 is provided. For purposes of clarity, the power connections and power distribution lines to the various electronics components internal and external to signal processor 350 are not shown.

In this embodiment, each input connector 252 is coupled to one telemetry receiver 145, one amplifier 253, one programmable delay line 361, and one programmable filter 362. Thus, each input connector 252 places a telemetry receiver 145 in communication with an amplifier 253, a programmable delay line 361, and a programmable filter 362 within housing 251. Each programmable filter 362 as well as computer 364 is coupled to multiplexer 363, which is coupled to outlet connector 254, which in turn is coupled to communication link transmitter 161.

Referring now to FIGS. 2 and 4, as previously described, during drilling operations, telemetry signal transmitter 142 communicates L/MWD telemetry signals to receivers 145 (e.g., via mud pulse telemetry, EM telemetry, acoustic telemetry, etc.). Telemetry receivers 145 receive the L/MWD telemetry signals and convert the L/MWD telemetry signals into electronic L/MWD telemetry signals 256. Prior to processing by signal processor 350, the electronic L/MWD signals 256 are considered raw or unprocessed (i.e., not amplified, conditioned, filtered, etc.). As best shown in FIG. 4, the unprocessed electronic L/MWD signals 256 are communicated from receivers 145 to signal processor 350 via input connectors 252. Within signal processor 350, the unprocessed electronic L/MWD telemetry signals 256 are amplified by signal conditioning buffer amplifiers 253, thereby converting the unprocessed electronic L/MWD signals 256 into processed or "amplified" electronic L/MWD telemetry signals 257a. Amplified electronic L/MWD telemetry signals 257a are communicated to programmable delay lines 361, each of which provides a time delay of the output of its input signal 257a. Thus, in this embodiment, programmable delay lines 361 time delay amplified electronic L/MWD telemetry signals 257a, thereby converting amplified electronic L/MWD telemetry signals 257a into amplified and delayed electronic L/MWD telemetry signals represented by arrows 257b. In general, time delaying is a type of signal processing in which one or more signals are time shifted. To time shift one or more signals, a delay line (e.g., delay line 361) samples input signals, stores the sampled input signals in a buffer, and then reads out the buffer (i.e., outputs the stored signals in the buffer) after a specified number of clock cycles.

Referring still to FIG. 4, amplified and phased electronic L/MWD telemetry signals 257b are communicated from programmable delay lines 361 to programmable filters 362, which filter or "clean" the amplified and phased electronic L/MWD telemetry signals 257b. In general, signal cleaning and filtering are types of signal processing in which undesirable portions of an input signal (e.g., noise) are removed from then input signal. Thus, in this embodiment, programmable filters 362 clean amplified and phased electronic L/MWD telemetry signals 257b, thereby amplified and phased electronic L/MWD telemetry signals 257b into amplified, phased, and filtered electronic L/MWD telemetry signals represented by arrows 257c. The outputs of programmable filters 362 (e.g., amplified, phased, and filtered electronic L/MWD telemetry signals 257c) may be written to D/A converters, or may consist of bit stream data. Amplified, phased, and filtered electronic L/MWD telemetry signals 257c from each programmable filter 362 is communicated to acoustic modem transmitter 161 via multiplexer 363. Multiplexer 363 receives signals 257c from all filters 362, selects one or more of signals 257c, and communicates the selected signal(s) 257c to acoustic modem transmitter 161 through a single output connector 254. Thus, as used herein, the term "multiplexer" refers to a device capable of receiving one or more analog or digital input signals, selecting one or more of the input signals, and forwarding the selected input signals with a single output line. Inclusion of a multiplexer (e.g., multiplexer 363) in the signal processor (e.g., signal processor 350) may be particularly advantageous in cases where the transmitter of the sea floor-to-sea surface communication link (e.g., acoustic modem transmitter 161 of communication link 160) does not include multiple inputs. The selected amplified, phased, and filtered electronic L/MWD telemetry signals 257c from multiplexer 363 transmitted to acoustic modem transmitter 161 are retransmitted to acoustic modem receiver 162 and offshore rig 102 for further processing and decoding.

DSP or computer 364 monitors and controls all the operations within signal processor 350. For example, DSP or computer 364 controls the programmable delay applied by each delay line 361, controls the filter applied by each filter 362, and controls the selection of input signals 257c by multiplexer 363. The DSP or computer 364 may also combine signal inputs so as to enhance the signal-to-noise ratio as described in more detail below.

Referring now to FIG. 5, a schematic view of still yet another embodiment of signal processor 450 that may be employed as signal processor 150 of FIG. 2 is shown. Similar to signal processor 350 shown in FIG. 4, in this embodiment, signal processor 450 comprises a pressure housing 251 including a plurality of high pressure feed-through input connectors 252, a plurality of signal conditioning buffer amplifiers 253, a plurality of high pressure feed-through output connectors 254, an external power input 255 extending through housing 251 a plurality of programmable delay lines 361, a plurality of programmable filters 362, and a digital signal processing (DSP) unit or computer 364. Connectors 252, 254, amplifiers 253, power input 255, delay lines 361, and filters 362 operate as previously described. For purposes of clarity, the power connections and power distribution lines to the various electronics components internal and external to signal processor 450 are not shown.

As shown in FIG. 5, in this embodiment, one buffer amplifier 253, one programmable delay line 361, and one programmable filter 362 is provided for each telemetry receiver 145. Specifically, each input connector 252 is coupled to one telemetry receiver 145, one amplifier 253, one programmable delay line 361, and one programmable filter 362. Thus, each input connector 252 places a telemetry receiver 145 in communication with an amplifier 253, a programmable delay line 361, and a programmable filter 362 within housing 251. Each programmable filter 362 is coupled to DSP or computer 364, which is coupled to each outlet connector 254. Outlet connectors 254 are coupled to communication link transmitter 161. However, in this embodiment, signal processor 450 does not include a multiplexer (e.g., multiplexer 363 is not provided in this embodiment).

Referring now to FIGS. 2 and 5, during drilling operations, signal processor 450 operates similar to signal processor 350 previously described. Namely, telemetry signal transmitter 142 communicates L/MWD telemetry signals to receivers 145, which convert the L/MWD telemetry signals into electronic L/MWD telemetry signals 256. The unprocessed electronic L/MWD signals 256 are communicated from receivers 145 to signal processor 450 via input connectors 252. Within signal processor 350, the unprocessed electronic L/MWD telemetry signals 256 are communicated to signal conditioning buffer amplifiers 253 and converted into amplified electronic L/MWD telemetry signals 257a. L/MWD telemetry signals 257a are communicated to programmable delay lines 361 and converted into amplified and phased electronic L/MWD telemetry signals represented by arrows 257b. L/MWD telemetry signals 257b are communicated to programmable filters 362 and converted into amplified, phased, and filtered electronic L/MWD telemetry signals 257c, which may be written to D/A converters, or may consist of bit stream data.

Amplified, phased, and filtered electronic L/MWD telemetry signals 257c from each programmable filter 362 are communicated to DSP or computer 364. L/MWD telemetry signals 257c are decoded by computer 364, thereby converting L/MWD telemetry signals 257c into decoded L/MWD telemetry signals 257d. In general, decoding refers to the process of translating or converting received electronic signals into useable information. In the context of telemetry, decoding refers to the process of translating electronic signals (e.g., L/MWD telemetry signals 257c) into information. In general, the decoded information may relate to a variety of parameters and/or conditions including, without limitation, downhole conditions acquired by the BHA sensors (e.g., sensors 142), conditions acquired by sensors further up the drillstring than the BHA sensors (e.g., velocity of currents proximal the rise, subsea temperatures proximal the riser, etc.), status of subsea equipment (e.g., capacity of subsea batteries), or combinations thereof. In addition, DSP or computer 364 monitors and controls all the operations within signal processor 350. For example, DSP or computer 364 controls the programmable delay applied by each delay line 361 and controls the filter applied by each filter 362. The DSP or computer 364 may also combine signal inputs so as to enhance the signal-to-noise ratio as described in more detail below.

The decoded L/MWD telemetry signals 257d are communicated from DSP or computer 364 to acoustic modem transmitter 161, and retransmitted by transmitter 161 to acoustic modem receiver 162 and offshore rig 102 for further processing and decoding. Thus, unlike the embodiment of signal processor 350 shown in FIG. 4, in this embodiment, no multiplexer is provided. Still further, unlike the embodiment of signal processor 350 shown in FIG. 4, in this embodiment, DSP or computer 364 communicates with and is controllable from the sea surface 121 and offshore rig 102. In particular, control signals 257e may be transmitted from sea surface 121 via communication link 160 to signal processor 450. Namely, the control signals 257e communicated subsea pass through transmitter 161 and one or more connectors 254 to DSP or computer 364. The control signals 254e generally instruct DSP or computer 364 how to manipulate and control amplification by amplifiers 253, phasing by delay lines 361, filtering by filters 362, as well as decoding by DSP or computer 364 itself.

Referring again to FIG. 2, in the manner described, embodiments of communication uplink system 140 described herein receive and detect telemetry uplink signals (e.g., L/MWD telemetry signals transmitted from bottomhole assembly 141) via instrumentation disposed at the sea floor (e.g., sea floor 124), mounted to a riser proximal the sea floor (e.g., mounted to riser 116 proximal BOP 119), mounted to the BOP (e.g., BOP 119), or combinations thereof. The instrumentation includes telemetry signal transducers (e.g., telemetry receivers 145) and associated signal processing electronics (e.g., signal processor 150, 250, 350, 450). The outputs of the subsea instrumentation is relayed from the sea floor to the sea surface (e.g., sea surface 121) and the offshore rig (e.g., platform 111) via an acoustic modem (e.g., acoustic modem 160) or a physical link (e.g., a wire, a cable, or a fiber optic link). The actual decoding and processing of L/MWD telemetry signals may be performed at the surface on the offshore rig or at another facility remote from the rig. Alternatively, all or some of the decoding and processing may be carried out at or near the sea floor. For example, the subsea signal processor (e.g., signal processor 450 shown in FIG. 5) may contain hardware to decode and process the uplink L/MWD telemetry signals. The decoded uplink signals would then be transmitted via the acoustic modem or physical link to the sea surface and rig or platform.

Various noise reduction techniques exist for L/MWD telemetry systems that make use of arrays of telemetry transducers or receivers. Deployment of such arrays is often severely limited due to space limitations, particularly on the offshore rig. However, as illustrated in FIG. 2, the use of the riser of a deep offshore installation, the BOP, the sea floor, or combinations thereof offers the potential to significantly increase the space available for the deployment of such telemetry transducer arrays.

In the embodiments of drilling system 100 and communication system 130 described above with reference to FIG. 2, telemetry communication uplink system 140 was generally described as including a bottomhole assembly 141 including L/MWD sensors 142 and telemetry transmitter 143, and one or more telemetry transducers or receivers 145 proximal the sea floor 124 that receive the L/MWD telemetry signals from telemetry transmitter 143. In general, telemetry communication uplink system 140 may employ electromagnetic (EM) telemetry technology, mud pulse telemetry technology, acoustic telemetry technology, or combinations thereof. Application of each of these three types of L/MWD telemetry will now be described in more detail.

Referring still to FIG. 2, in the case of an electromagnetic (EM) telemetry uplink (i.e., telemetry communication uplink system 140 relies on EM telemetry), telemetry signal transmitter 143 preferably comprises an EM tool that generates an altered voltage difference between portions of drillstring 115 on opposite sides of an insulator. For example, transmitter 143 may comprise a direct connect type transmitter that utilizes an output voltage applied between two electrical terminals that are electrically isolated from one another to generate electromagnetic wave fronts that radiate into the earth carrying the information obtained by receivers 145. In addition, telemetry signal transducers or receivers 145 preferably comprise one or more magnetometers mounted to the riser 126 and/or BOP 119. Receivers 145 may detect either the electrical field (E-field) component of the electromagnetic wave fronts, the magnetic field (H-field) component of the electromagnetic wave fronts, or both. In general, telemetry receivers 145 function as transducers transforming the electromagnetic wave fronts from the transmitter 143 into electric signals (e.g., signals 256). For EM telemetry uplink, each telemetry receiver 145 preferably comprise a single magnetometer, a three-axis magnetometer (the three axes being generally orthogonal), or an array of magnetometers employed in a vertical and/or horizontal arrangement. As is known in the art, a magnetometer is an instrument used to measure the strength and/or direction of the magnetic field in the vicinity of the instrument. In the case of an array of magnetometers, the magnetometers are preferably arranged to reduce and/or cancel electromagnetic interference. In addition, one or more magnetometers may be positioned proximal the sea floor 124, but remote from the riser 116 and the BOP 111. Such remote magnetometers are preferably operated so as to reduce and/or cancel undesirable noise. The noise reduction and/or cancellation may be effected using either synthetic steering of the magnetometers and/or noise references developed from the magnetometers as described in U.S. Pat. No. 6,657,597, which is hereby incorporated herein by reference in its entirety for all purposes.

For EM telemetry uplink, each telemetry receiver 145 also preferably includes one or more electric field antennas installed at or near riser 126 or BOP 119, and/or remote from riser 126 and BOP 119. Signal processing similar to that described above for the magnetometers can be effected for the electric field antennas. The electric field antennas may include metallic spikes in any orientation, vertical wires, horizontal wires, or combinations thereof. For example, an embodiment of an electric field antenna 600 that may be employed as a receiver 145 in FIG. 2 is shown. Electric field antenna 500 includes a conductive metallic body 501 and a plurality of metallic spikes 502 extending therefrom.

Figure 7:
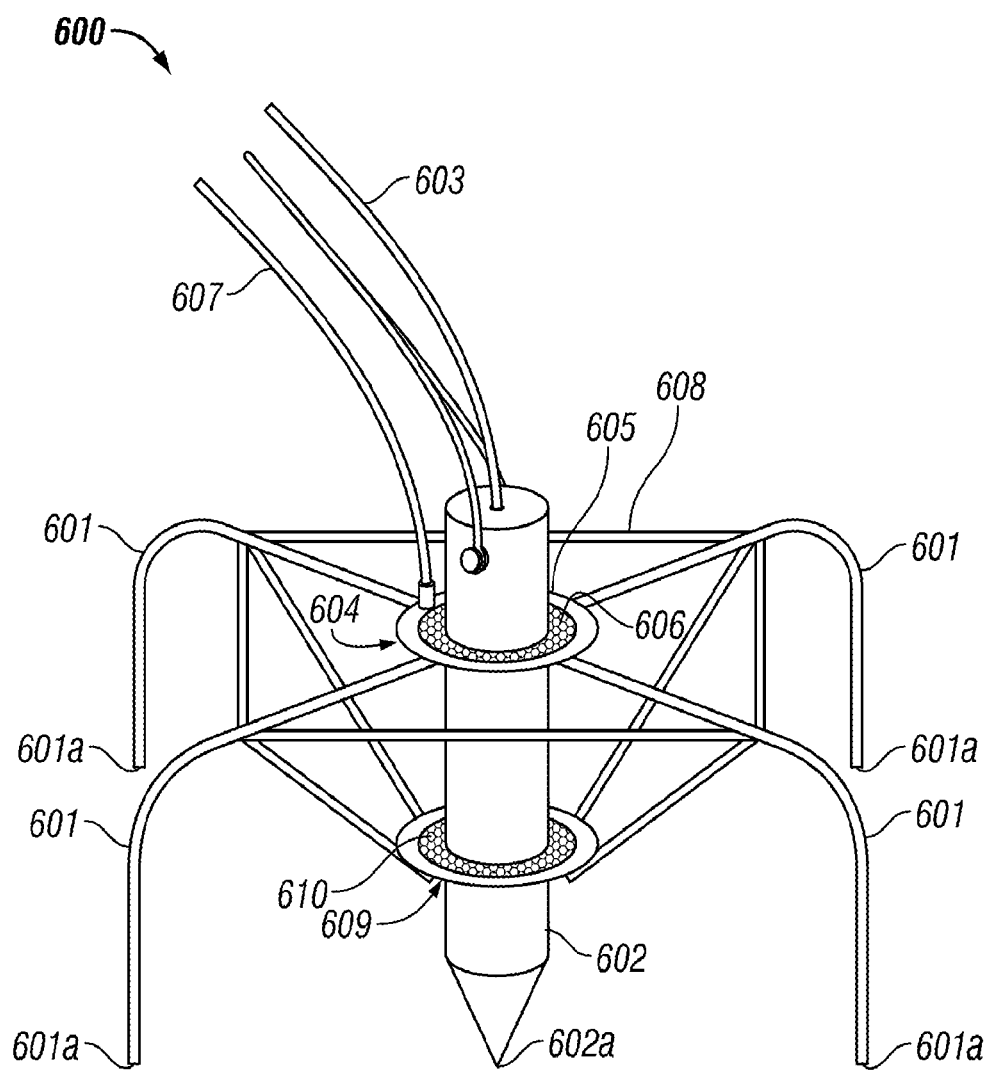
FIG. 7 is a perspective view of an embodiment of an electric field antenna that may be employed as a receiver in the offshore L/MWD data communication system of FIG. 2.

Referring now to FIG. 7, another exemplary embodiment of an electric field antenna 600 that may be employed as a receiver 145 in FIG. 2 is shown. Electric field antenna 600 includes a plurality of E-field probes 601 to pickup the E-field component of electromagnetic wave fronts transmitted by transmitter 143 and an H-field probe 602 to pickup the H-field component of electromagnetic wave fronts transmitted by transmitter 143. E-field probes 601 may be constructed from a conductive material such as steel, copper or a copper clad. E-field probes 601 each have an end 601a inserted into the sea floor 124. H-field probe 602 also has an end 602a inserted into the sea floor 124. H-field probe 602 includes one or more magnetometers for detecting the H-field component of the electromagnetic wave fronts transmitted by transmitter 143. The information carried in the H-field component is obtained by H-field probe 602 and transmitted to the subsea signal processor 150 in H-field wireline cable 603.

Electric field antenna 600 also includes an insulated ring 604 that attaches E-field probes 601 to H-field probe 602. Insulated ring 604 includes an electrically conductive ring 605 and a dielectric ring 606. The electrically conductive ring 605 is attached to E-field probes 601 to provide an electrically conductive path between E-field probes 601 and an E-field wireline cable 607. E-field wireline cable 607 transmits the current created in E-field probes 601 by the electromagnetic wave fronts from transmitter 143 to the subsea signal processor 150. The dielectric ring 606 creates a non-conductive region between conductive ring 605 and H-field probe 602. Electric field antenna 600 may include an insulated cradle 608 that is disposed between E-field probes 601 and H-field probe 602. Insulated cradle 608 provides structural support to E-field probes 601 to prevent relative translational or rotational motion between E-field probes 601 and H-field probe 602. Insulated cradle 608 may be attached to H-field probe 602 using an insulated ring 609 which may include a dielectric ring 610. Other examples of suitable electric field antennas that may be employed for one or more receivers 145 are shown and described in U.S. Pat. No. 5,959,548, which is hereby incorporated herein by reference in its entirety.

Figure 8:
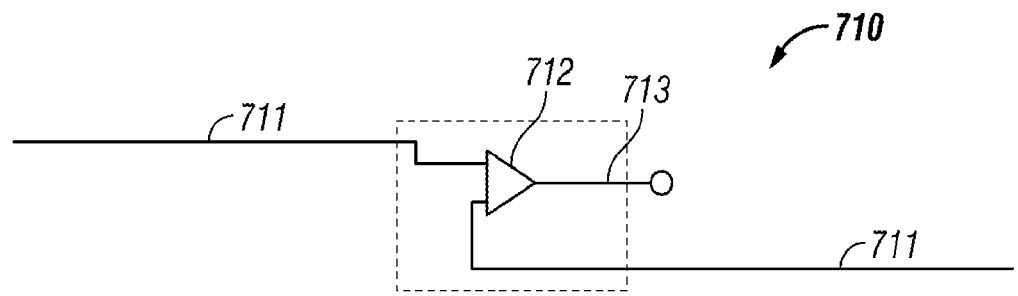
FIG. 8 is a schematic view of an embodiment of an electric field antenna that may be employed as a receiver in the offshore L/MWD data communication system of FIG. 2.
Figure 9:
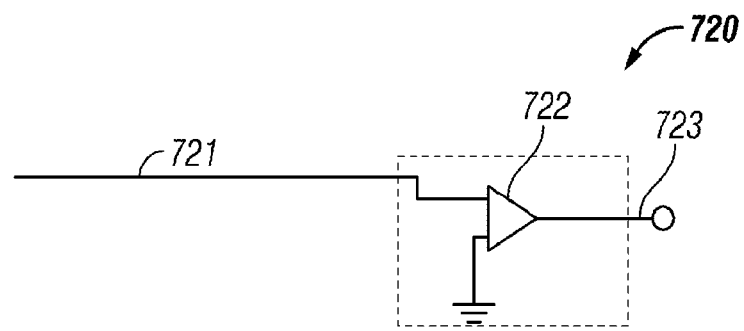
FIG. 9 is a schematic view of an embodiment of an electric field antenna that may be employed as a receiver in the offshore L/MWD data communication system of FIG. 2.
Figure 10:
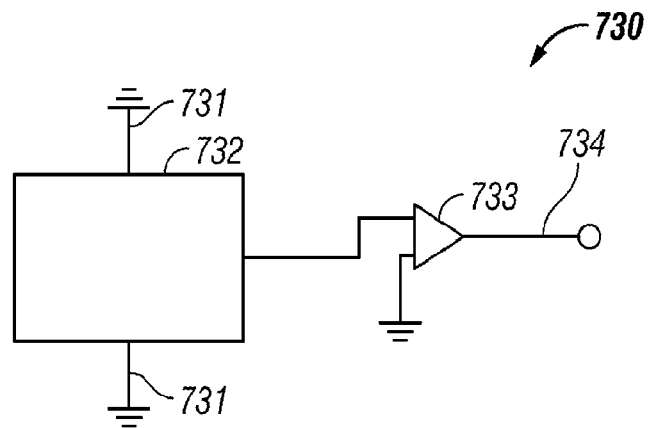
FIG. 10 is a schematic view of an embodiment of an electric field antenna that may be employed as one or more of the receivers in the offshore L/MWD data communication system of FIG. 2.

Referring now to FIGS. 8-10, additional examples of electric field antenna 710, 720, 730, respectively, that may be employed as a receiver 145 in FIG. 2 are shown. In general, the embodiments shown in FIGS. 8-10 are designed to detect the E-field component of electromagnetic wave fronts transmitted by transmitter 143. In FIG. 8, electric field antenna 710 measures the electric fields using a pair of antenna 711 connected across a differential amplifier 712. Amplifier 712 has an output 713 that transmits the electrical current created in electric field antenna 710 to the subsea signal processor 150. In FIG. 9, electric field antenna 720 measures the electric fields using a single antenna 721 connected to an amplifier 722 having a single-ended input 722 and referenced to earth ground. Amplifier 722 has an output 723 that transmits the electrical current created in electric field antenna 720 to the subsea signal processor 150. And in FIG. 10, electric field antenna 730 measures the electric fields using a pair of spikes 731 mounted to a metallic body 732 that is connected to an amplifier 733 having a single-ended input 733 and referenced to earth ground. Amplifier 733 has an output 734 that transmits the electrical current created in electric field antenna 730 to the subsea signal processor 150.

Referring again to FIG. 2, in the case of a mud pulse telemetry uplink (i.e., telemetry communication uplink system 140 relies on mud pulse telemetry), telemetry signal transmitter 143 preferably comprises a pressure signal transmitter or mud pulser (e.g., a valve operated to restrict the flow of drilling mud down the drillstring 115), and telemetry signal receivers 145 preferably comprises one or more pressure sensors coupled to riser 126 or BOP 119. Embodiments of mud pulsers and pressure sensors that may be employed as signal transmitter 143 and telemetry signal receivers 145, respectively, are described in more detail below.

Figure 11:
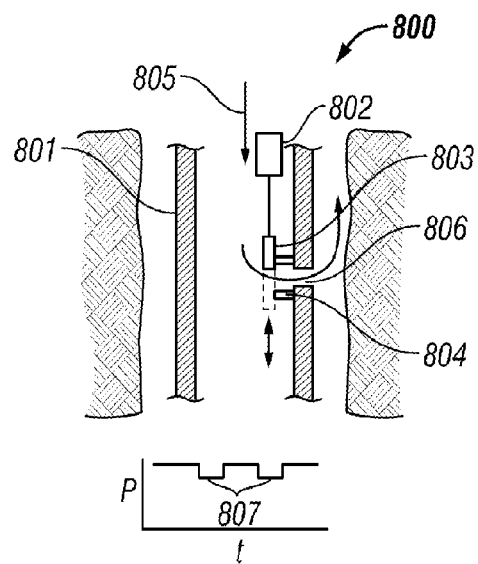
FIGS. 11-14 are schematic views of embodiments of pressure signal transmitters that may be employed as the transmitter in the offshore L/MWD data communication system of FIG. 2.
Figure 12:
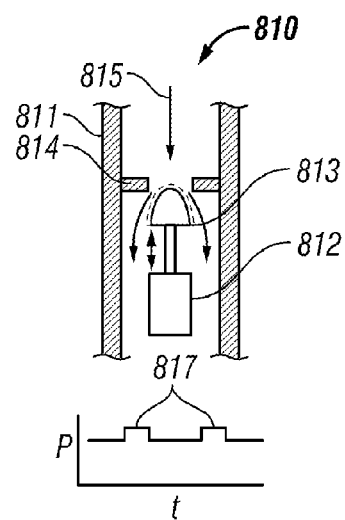
Figure 13:
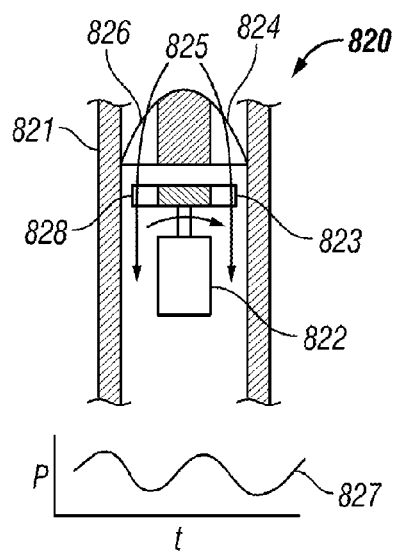
Figure 14:
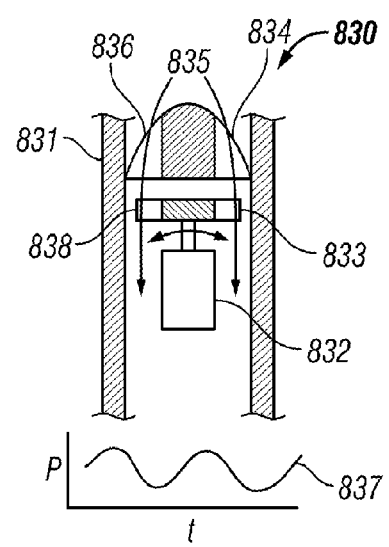

Referring now to FIGS. 11-14, exemplary embodiments of pressure signal transmitters or mud pulsers that may be employed as telemetry signal transmitter 143 of FIG. 2 are shown. In FIG. 11, a pressure signal transmitter 800 is disposed in data signaling unit 801 along the drillstring (e.g., drillstring 115) is shown. Pressure signal transmitter 800 has drilling fluid 805 flowing therethrough and comprises an actuator 802 that moves a gate 803 back and forth against seat 804 allowing a portion of fluid 805 to intermittently pass through opening 806 thereby generating a negative pressure signal 807 that propagates to the surface through drilling fluid 805. In FIG. 12, a pressure signal transmitter 810 is disposed in data signaling unit 811 along the drillstring (e.g., drillstring 115) is shown. Pressure signal transmitter 810 has drilling fluid 815 flowing therethrough and comprises an actuator 812 that moves a poppet 813 back and forth toward orifice 814 partially obstructing the flow of drilling fluid 815 thereby generating a positive pressure signal 817 that propagates to the surface through drilling fluid 815. In FIG. 13, a pressure signal transmitter 820 disposed in data signaling unit 821 along the drillstring (e.g., drillstring 115) is shown. Pressure signal transmitter 820 has drilling fluid 825 flowing therethrough and comprises an actuator 822 that continuously rotates a rotor 823 in one direction relative to stator 824. Stator 824 has flow passages 826 allowing fluid 825 to pass therethrough. Rotor 823 has flow passages 828 and the movement of flow passages 828 past flow passages 826 of stator 824 generates a continuous wave pressure signal 827 that propagates to the surface through drilling fluid 825. Modulation of the continuous wave pressure signal may be used to encode data therein. Modulation schemes may comprise frequency modulation and phase shift modulation. In FIG. 14, a pressure signal transmitter 830 disposed in data signaling unit 831 along the drillstring (e.g., drillstring 115) is shown. Pressure signal transmitter 830 has drilling fluid 835 flowing therethrough and comprises an actuator 832 that rotates a rotor 833 back and forth relative to stator 834. Stator 834 has flow passages 836 allowing fluid 835 to pass therethrough. Rotor 833 has flow passages 838 and the alternating movement of flow passages 838 past the flow passages 836 of stator 834 generates a continuous wave pressure signal 837 that propagates to the surface through drilling fluid 835. Modulation of the continuous wave pressure signal may be used to encode data therein. Modulation schemes may comprise frequency modulation and phase shift modulation.

Figure 15:
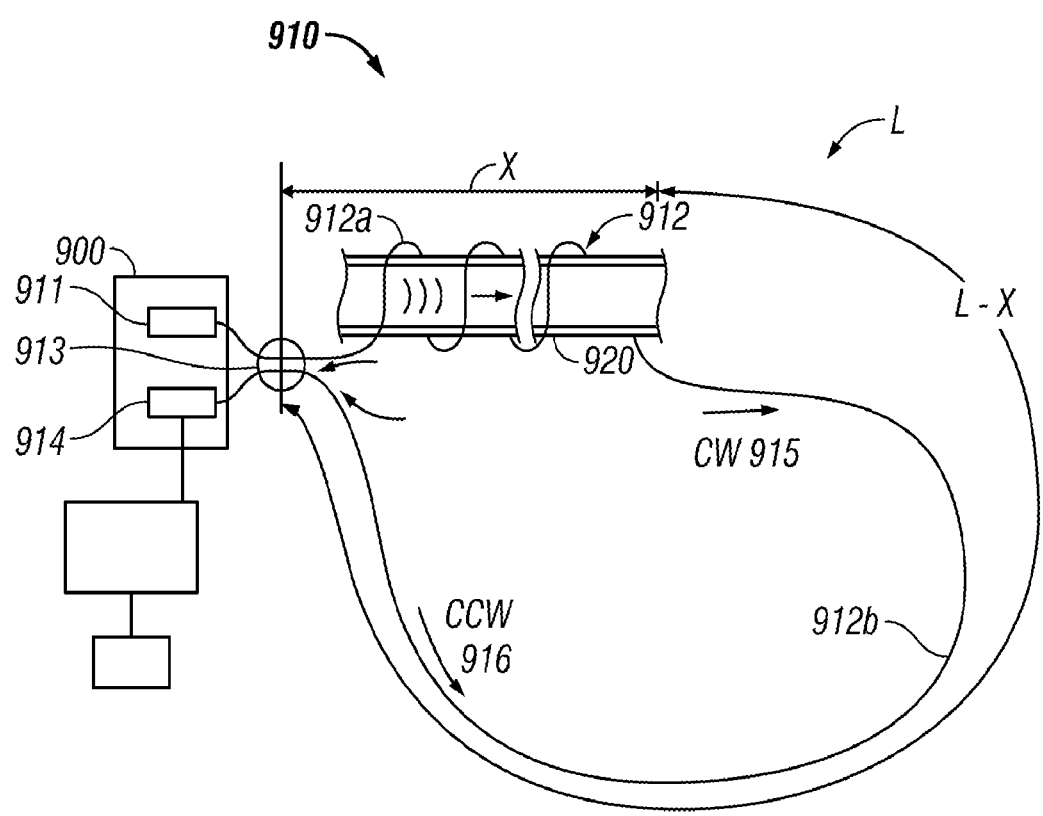
FIG. 15 is a schematic view of an embodiment of a fiber optic pressure transducer that may be employed as one or more of the receivers in the offshore L/MWD data communication system of FIG. 2.

Referring again to FIG. 2, for mud pulse telemetry, each receiver 145 may comprise any suitable type of pressure sensor. However, in embodiments described herein employing mud pulse telemetry uplink communications, each receiver 145 preferably comprises a fiber optic pressure transducer strapped or clamped to the riser 126 proximal the BOP 119. Referring now to FIG. 15, an exemplary embodiment of a fiber optic pressure transducer 900 comprising an optical interferometer 910 for detecting pressure signals in a conduit 920 is shown. Interferometer 910 comprises a light source 911, an optical fiber loop 912, an optical coupler/splitter 913, and an optical detector 914. As used herein, an "optical coupler/splitter" encompasses integrated coupler splitters and individual couplers and splitters. Light source 911 may be a laser diode, a laser, or a light emitting diode that emits light into optical coupler/splitter 913 where the light is split into two beams 915 and 916. Beam 915 travels clockwise (CW) through loop 912, and beam 916 travels counter-clockwise (CCW) through loop 912.

Loop 912 has a length, L, and comprises measurement section 912a and delay section 912b. In one embodiment, measurement section 912a may be 2-10 meters in length. In this example, measurement section 912a is wrapped at least partially around conduit 920, which may be riser 126 or BOP 119 of FIG. 2. Alternatively, measurement section 912a may be wrapped around any section of flow conduit that has pressure signals travelling therein. The length of measurement section 912a is designated by X in FIG. 15, and represents the length of fiber that reacts to hoop strains in conduit 920 caused by the pressure signals therein. The optical fibers of measurement section 912a may be physically adhered to conduit 920. Alternatively, measurement section 912a may comprise a length, X, of optical fiber adhered in a folded pattern to a pliant or flexible band that is attachable to a conduit.

Delay section 912b may be on the order of 500-3000 meters in length. The small diameter of optical fibers contemplated (on the order of 250 μm) allows such a length to be wound on a relatively small spool. As shown in FIG. 15, delay section 912b comprises a length identified as L-X. It will be seen that L is a factor in the sensitivity of the sensor.

Counter-propagating beams 915, 916 traverse loop 912 and recombine through coupler/splitter 913, and are detected by photo-detector 914. Under uniform (constant in time) conditions, beams 915, 916 will recombine in phase at the detector 914 because they have both traveled equal distances around loop 912. Consider counter-propagating beams 915, 916 and a time varying pressure P(t) in conduit 920. Beams 915, 916 will be in phase after they have traveled the distance X in their two paths, and they will be in phase after they have continued through the distance L−X as well. Now, let the pressure within the pipe be changing at a rate of dP/dt during the time Δt while beams 915, 916 travel the distance L−X, then $$\Delta t = (L-X)n/c,$$

where c is the speed of light, and n is the refractive index of the optical fiber. During this time interval, the pressure within the pipe changes by an amount ΔP, which acts to radially expand conduit 920. This expansion results in a change ΔX in the length, X, of the measurement section 912a of optical fiber 230 wrapped around conduit 920. Although at the end of the interval Δt the two beams are in phase, they will go out of phase for the last portion of the circuit before they recombine, because the length of measurement section 912a has changed during the previous interval Δt. For the final leg of the trip around the loop, the counter-clockwise beam 916 will travel a distance that is different by an amount ΔX from the clockwise rotating beam 915. When the beams combine at detector 914, they will be out of phase by a phase difference, Δϕ, where $$\Delta\phi = 2\pi(\Delta X)/n\lambda,$$

where λ is the wavelength of the light emitted by source 911. As beams 915, 916 are combined, it can be shown that a factor in the signal will be cos(Δφ/2). Thus, counter propagating beams 915, 916 will be out of phase when ΔX=λ.

The change of the pressure in the pipe during the interval Δt is given by, $$\Delta P = (dP/dt)\Delta t = (dP/dt)(L-X)(n/c).$$

Let K be the sensitivity of the pipe to internal pressure; that is, the change in circumference of the pipe ΔC due to a change in pressure ΔP given by, $$\Delta C = K(\Delta P)$$

K can be computed from dimensions and material properties of the pipe materials. For example, for a thin-walled pipe, where $D_{pipe} > 10^*$pipe thickness, t, it can be shown that $$K = \pi D_{pipe}^2 / 2Et$$

where E is the modulus of elasticity of the pipe material. For a thick walled pipe, where $D_{pipe} \leq 10^*$pipe thickness, t, it can be shown that $$K = 2\pi D_o D_i^2 / E(D_o^2 - D_i^2)$$

where $D_o$ and $D_i$ are the outer and inner pipe diameters, respectively.

If $N_{coil}$ is the number of tuners of fiber around the pipe, then $$\Delta X = N(\Delta C) = N_{coil} K(dP/dt)(L-X)(n/c).$$

Thus, the change in length indicated by the interferometer is a function of the time derivative of the pressure signal, the number of turns $N_{coil}$ of fiber on the pipe, and the length L of the delay portion of the fiber.

Other examples of suitable fiber optic pressure transducers are described in PCT Patent Application Serial No. PCT/US09/50628, which is hereby incorporated herein by reference in its entirety for all purposes.

The design considerations for mud pulse telemetry uplink (i.e., telemetry communication uplink system 140 relies on mud pulse telemetry) are somewhat different than those for an EM telemetry uplink (i.e., telemetry communication uplink system 140 relies on EM telemetry). In general, a mud pulse telemetry signal consists of a pressure wave propagating up the inner bore of the drillstring (e.g., drillstring 115). However, whenever a mud pulser (e.g., pressure signal transmitter 800, 810, 820, 830) produces a signal in the inner bore of the drillstring (e.g., drillstring 115), it also produces at least one signal in (a) the annular space between the drillstring and casing or borehole wall (e.g., annulus 122), (b) the annular space between the drillstring and the BOP (e.g., BOP 119), or (c) the annular space between the drillstring and the riser (e.g., riser 126) depending on the depth at which the pressure is monitored. The relationship between the signal in the annulus and the signal in the bore of the drillstring depends on the type of mud pulser that is used to generate the pressure wave (i.e., positive pulser, negative pulser, or continuous/siren pulser).

In general, a "positive" pulser creates a pressure change in the drilling mud flowing through the inner bore of the drillstring by momentarily restricting the flow of drilling mud flowing down the drillstring to the drill bit. For example, as previously described with respect to FIG. 12, pressure signal transmitter 810 is a positive pulser that includes actuator 812 that moves a poppet 813 back and forth toward orifice 814 partially obstructing the flow of drilling fluid 815. As a result of momentary restriction in the flow of drilling mud in the drillstring, a positive pressure pulse (e.g., pulse 817) propagates up the inner bore of the drillstring, and a negative pressure pulse propagates down the inner bore of the drillstring. The negative pressure pulse passes through the drill bit nozzles and then propagates back up the annulus surrounding the drillstring.

Figure 16:
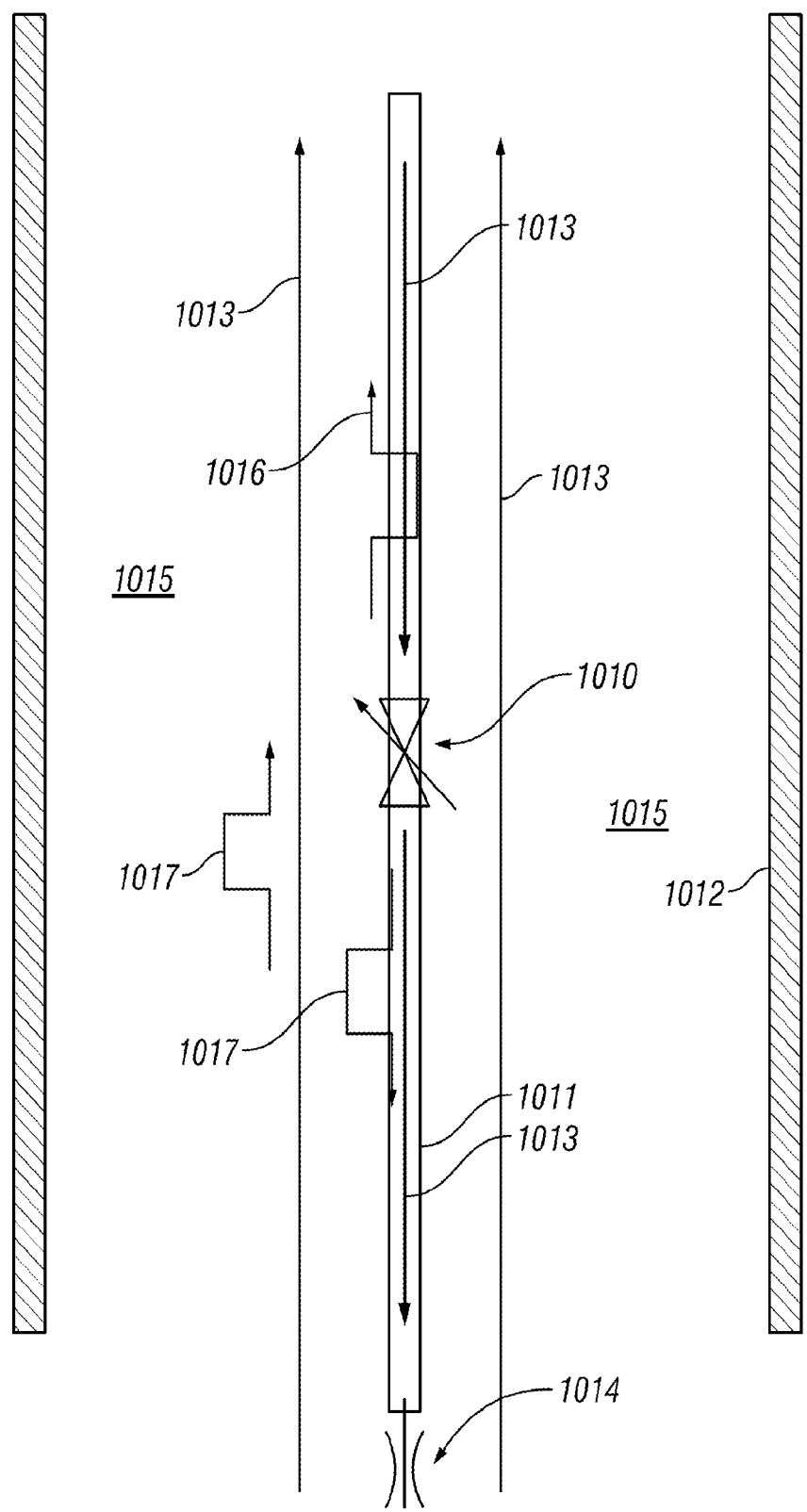
FIG. 16 is a schematic view of an embodiment of a positive pulser that may be employed as the transmitter in the offshore L/MWD data communication system of FIG. 2.

Referring now to FIG. 16, an exemplary embodiment of a positive pressure pulser 1010 is shown disposed in a drillstring 1011 extending through a borehole 1012. Positive pressure pulser 1010 may be employed as telemetry signal transmitter 143 of FIG. 2 in the case telemetry communication uplink system 140 is a mud pulse telemetry uplink. As shown in FIG. 16, drilling mud 1013 flows down the inner bore of the drill string 1011 and exits drillstring 1011 via nozzles in the drill bit 1014. Upon exiting drillstring 1011, the drilling mud 1013 flows back to the surface within the annulus 1015 between drill string 1011 and the borehole 1012. A momentary restriction in the flow of drilling mud 1013 down the drillstring 1011 by positive pulser 1010 results in a positive pressure pulse 1016 that propagates up the inner bore of the drillstring 1011 and a negative pressure pulse 1017 that propagates down the inner bore of the drillstring 1011. Negative pressure pulse 1017 passes through the nozzles of the drill bit 1014, and then propagates back up the annulus 1015.

In general, a "negative" pulser creates a pressure change in the drilling mud flowing through the inner bore of the drillstring by momentarily opening a fluid passage between the inner bore of the drillstring and the annulus surrounding the drillstring. For example, as previously described with respect to FIG. 11, pressure signal transmitter 800 is a negative pulser that includes an actuator 802 that moves a gate 803 back and forth against seat 804 allowing a portion of fluid 805 to intermittently pass through opening 806. As a result, a negative pressure pulse (e.g., pulse 807) propagates up and down the inner bore of the drillstring. The negative pulse propagating down the inner bore of the drillstring, passes through the drill bit nozzles, and then propagates back up the annulus surrounding the drillstring. In addition, a positive pressure pulse is generated in the annulus due to the momentary venting of the higher pressure drilling mud in the drillstring to the lower pressure drilling mud in the annulus. The positive pressure pulse propagates up the annulus.

Figure 17:
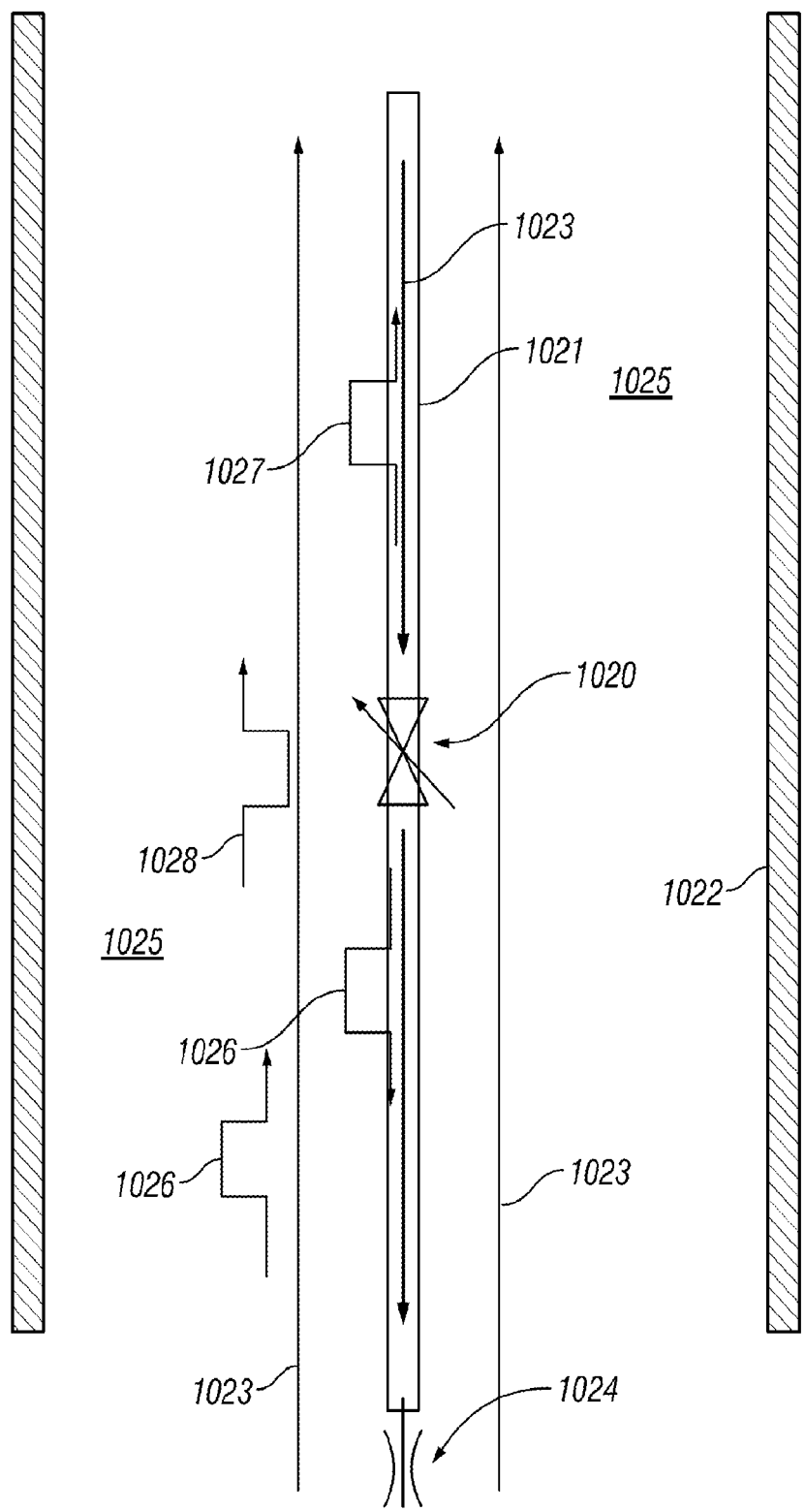
FIG. 17 is a schematic view of an embodiment of a negative pulser that may be employed as the transmitter in the offshore L/MWD data communication system of FIG. 2.

Referring now to FIG. 17, an exemplary embodiment of a negative pressure pulser 1020 is shown disposed in a drillstring 1021 extending through a borehole 1022. Negative pressure pulser 1020 may be employed as telemetry signal transmitter 143 of FIG. 2 in the case telemetry communication uplink system 140 is a mud pulse telemetry uplink. As shown in FIG. 17, drilling mud 1023 flows down the inner bore of the drill string 1021 and exits drillstring 1021 via nozzles in the drill bit 1024. Upon exiting drillstring 1021, the drilling mud 1023 flows back to the surface within the annulus 1025 surrounding the drill string 1021. A momentary opening of a fluid passage between the inner bore of the drillstring 1021 and the annulus 1025 by negative pulser 1020 results in a negative pressure pulse 1026 that propagates down the inner bore of the drillstring 1021, a negative pressure pulse 1027 that propagates up the inner bore of the drillstring 1021, and a positive pressure pulse 1028 that propagates up the annulus 1025. The negative pressure pulse 1026 that propagates down the inner bore of the drillstring 1021 passes through the nozzles of the drill bit 1024, and then propagates back up the annulus 1024.

As is known in the art, a "positive" pulser can be operated as a "negative" pulser by normally restricting flow in the bore of the drillstring, and momentarily opening flow (i.e., momentarily removing the restriction) to create negative pressure pulse that propagates up the inner bore of the drillstring, and a positive pressure pulse that propagates down the inner bore of the drillstring, passes through the drill bit nozzles, and then propagates back up the annulus surrounding the drillstring.

In general, a "continuous" pulser or "siren" regulates drilling mud flow and hence pressure drop via a continuous partial blocking and partial opening of the drilling fluid flow path in the inner bore of the drillstring. For example, as previously described with respect to FIG. 13, pressure signal transmitter 820 is a continuous pulser that includes an actuator 822 that continuously rotates a rotor 823 in one direction relative to stator 824. As rotor 823 rotates relative to stator 824, drilling mud flow passages 828 in rotor 823 rotate past drilling mud flow passages 826 of stator 824. As a result, a continuous wave (e.g., waves 827) propagates up and down the inner bore of the drillstring. When the pressure pulse propagating up the inner bore of the drillstring is positive, a corresponding negative pressure pulse propagates down the drillstring, through the nozzles in the bit, and back up the annulus; and when the pressure pulse propagating up the inner bore of the drillstring is negative, a corresponding positive pressure pulse propagates down the drillstring, through the nozzles in the bit, and back up the annulus.

Figure 18:
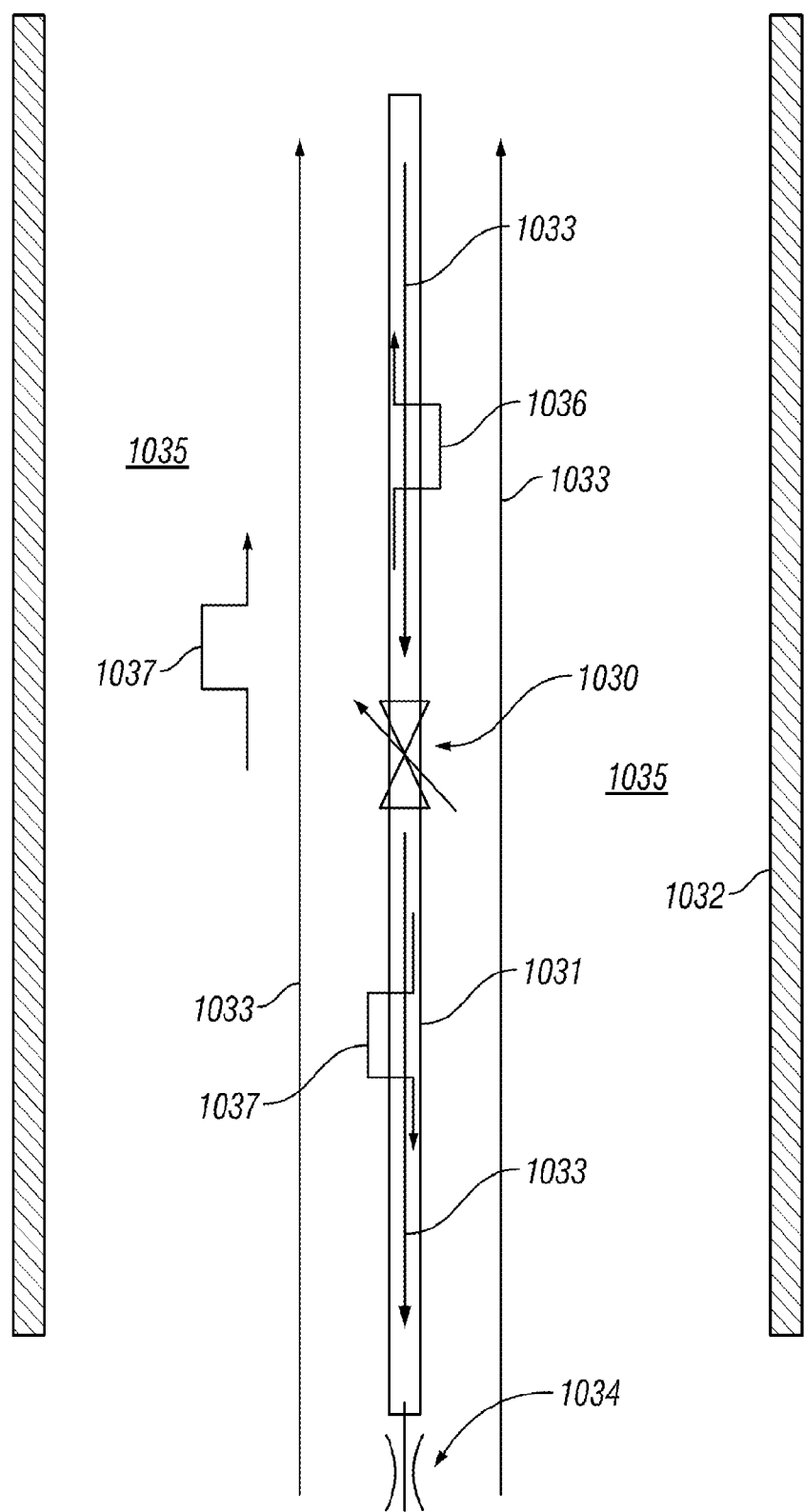
FIG. 18 is a schematic view of an embodiment of a continuous pulser pressure signal transmitters that may be employed as the transmitter in the offshore L/MWD data communication system of FIG. 2.

Referring now to FIG. 18, an exemplary embodiment of a siren or continuous pressure pulser 1030 is shown disposed in a drillstring 1031 extending through a borehole 1032. Continuous pressure pulser 1030 may be employed as telemetry signal transmitter 143 of FIG. 2 in the case telemetry communication uplink system 140 is a mud pulse telemetry uplink. As shown in FIG. 18, drilling mud 1033 flows down the inner bore of the drill string 1031 and exits drillstring 1031 via nozzles in the drill bit 1034. Upon exiting drillstring 1031, the drilling mud 1033 flows back to the surface within the annulus 1035 surrounding the drill string 1031. Siren 1030 continuously regulates the flow of drilling mud 1033 down the drillstring 1031 and the associated pressure fluctuations. As shown in FIG. 18, when a positive pressure pulse 1036 propagates up the inner bore the drillstring 1031, a negative pressure pulse 1037 propagates down the drillstring 1031. The negative pressure pulse 1037 flows through the nozzles in the bit 1034, and back up the annulus 1035. Alternatively, when a negative pressure pulse propagates up the inner bore the drillstring, a positive pressure pulse propagates down the drillstring, through the nozzles in the bit, and back up the annulus.

Without being limited by this or any particular theory, in the case of a positive pulser, a negative pulser, or a siren, the amplitude of the pressure pulse propagating in the annulus is significantly less than the amplitude of the pressure pulse propagating in the inner bore of the drillstring. Specifically, if the inner diameter of the drillstring is $D_i$, the outer diameter of the drillstring is $D_o$, and the inner diameter of the casing, BOP, or riser defining the outer radius of the annulus is $D_c$, then the absolute value of the ratio between the pressure pulse amplitude in the annulus and the pressure pulse amplitude in the inner bore of the drillstring will be less than or equal to the following:

$$\frac{Di^2}{Dc^2 - Do^2}$$

Further, the absolute value of the ratio decreases as the losses in the system increase. In general, the algebraic sign of the ratio will depend on the manner in which the signal is generated—positive pulser, negative pulser, or siren. Although the pressure pulse at the outer wall of the riser or BOP may be faint, the sensitivity of a fiber optic pressure transducer (e.g., pressure transducer 900) may be increased indefinitely by increasing the length of fiber around the riser (e.g., rise 126) or BOP (e.g., BOP 119).

Installation of an array of two or more pressure sensors or transducers along the riser or BOP is relatively simple. The pressure sensors may be spaced appropriately on the riser (e.g., riser 126) proximal the sea floor (e.g., sea floor 124). In particular, the pressure sensors on the riser are preferably spaced apart a distance between 0.1 and 2.0 times the anticipated wavelength of the pressure pulses passing through the riser. In general, the length of a pressure pulse is known or may be calculated. For example, the pressure pulse wave speed is typically about 5,0000 ft/s, and the length of a pressure pulse is pulse width times the wave speed.

Mounting of the pressure sensors on the riser proximal the sea floor is in contrast to conventional offshore telemetry systems that typically mount the pressure sensors at the sea surface, where the length of available flow line for mounting the pressure sensors may be limited. Proximal the sea floor, there is sufficient space along the riser for mounting an array of pressure sensors, with the pressure sensors being spaced on the order of a pressure pulse length. The array of pressure sensors mounted to the riser may be driven from a single electronics module located at or near the sea floor, with fiber optic cable being the only communication necessary between the electronics module and the individual pressure sensors. In addition to increased space on the riser for mounting the array of pressure sensors, another advantage of pressure pulse detection near the sea floor is increased distance from and increased attenuation of surface noise (e.g., noise from drilling mud recirculation requirement, pumps, etc.). Since surface noise presents significant problems for sea surface detection of pressure pulses communicated from the bottomhole assembly through the riser, the increased attenuation of noise achieved by detection of pressure pulses at or near the sea floor offers the potential to significantly improve the signal to noise ratio (S/N ratio). Further, detection of the pressure pulses at or near the sea floor enables detection at a point that is below the attenuating, cooler mud, which attenuates surface noise and would otherwise attenuate the pressure pulse signal if detection was performed at the sea surface. This may be particularly advantageous in cold environments where the viscosity of the drilling mud may change significantly in the upper portion of the riser, thereby tending to lead to relatively high levels of signal attenuation. However, by detecting the pressure pulse signals on the riser, near the sea floor, this problem can be significantly reduced and/or eliminated.

A further complication that often needs to be accounted for in mud pulse telemetry systems is the reflection of pressure pulse signals moving downward through the drill string from the pulser or transmitter off the drill bit. Such reflected pressure pulse signals travel back up the inner bore of the drillstring. Without being limited by this or any particular theory, although the nozzles at the drill bit act as a restriction to the signal and allow some fluid passage, the bit generally acts like a closed boundary (i.e., a boundary that does not allow the passage of fluid). Consequently, the pressure pulses moving down the inner bore of the drillstring to the drill bit and the pressure pulses reflected by the drill bit back up the inner bore of the drillstring have the same polarity. Thus, with a negative pulser, the pressure pulses reflected from the drill bit in the drillstring reinforce the pressure pulses that originate at and move upward from the negative pulser in the drillstring. Specifically, as previously described with respect to FIG. 17, the pressure pulses that originate at the negative pulser and move upward from the negative pulser in the inner bore of the drillstring are negative pulses, and the pressure pulses moving downward in the inner bore of the drillstring from the negative pulser are negative pulses. Thus, the pressure pulses reflected from the drill bit, which have the same polarity of the pressure pulses traveling downward in the inner bore of the drillstring, are also negative pulses. As a result, the pressure pulses reflected from the drill bit back up the inner bore of the drillstring constructively interfere with the pressure pulses that originate at and move upward from the negative pulser.

On the other hand, with a positive pulser, the pressure pulses reflected from the drill bit in the drillstring cancel (with delay) the pressure pulses that originate at and move upward from the positive pulser in the drillstring. Specifically, as previously described with respect to FIG. 16, the pressure pulses that originate at the positive pulser and move upward from the positive pulser in the inner bore of the drillstring are positive pulses, and the pressure pulses moving downward in the drillstring from the positive pulser are negative pulses. Thus, the pressure pulses reflected from the drill bit, which have the same polarity of the pressure pulses traveling downward in the inner bore of the drillstring, are also negative pulses. As a result, the pressure pulses reflected from the drill bit back up the inner bore of the drillstring destructively interfere with the pressure pulses that originate at and move upward from the positive pulser.

As best shown in FIG. 2, at the sea floor 124, the drillstring 115 is surrounding by the drilling mud in the annulus 125 formed between the drillstring 115 and the BOP 119 or riser 126. The pressure pulses in the inner bore of the drillstring 115 cause strain in the walls of the drillstring 115 that communicate pressure waves to the drilling fluid in the annulus 125. The pressure waves passing through the drill bit nozzles and back up annuli 122, 125 cause strain in the walls of the BOP 119 or the riser 126. The strain in the walls of the BOP 119 or riser 126 due to pressure pulses in the drillstring 115 and annulus 125 can be measured by strapping or clamping a strain gage or strain-responsive transducer to the BOP 119 and/or the riser 119. In other words, one or more receivers 145 may comprise a strain gage or strain-responsive transducer. For example, fiber optic pressure transducer 900 previously described with respect to FIG. 15 may be employed as a receiver 145 and also functions as a strain responsive transducer. Other examples of suitable strain responsive transducers are described in PCT Patent Application No. PCT/US09/50628, which is hereby incorporated herein by reference in its entirety for all purposes.

It should be appreciated that such strain-responsive transducers (e.g., fiber optic pressure transducer 900) will respond to both (1) the pressure waves that propagate in the inner bore of the drillstring (via the corresponding strain in the wall of the drillstring, which causes pressure waves in the annulus that in-turn impart strain in the wall of the BOP or riser), and (2) the pressure waves that propagate in the annulus from the nozzles in the drill bit (via the corresponding strain imparted in the wall of the BOP or riser). Without being limited by this or any particular theory, it is anticipated that the latter pressure waves (i.e., the pressure waves that propagate in the annulus from the nozzles in the drill bit) will be the stronger than the former pressure waves (i.e., the pressure waves that propagate in the inner bore of the drillstring). Nevertheless, since the distance between the pulser that generates the pressure waves and the drill bit is fixed, the time delay between the two pressure waves is generally fixed, and the phase relation may be determined based on the type pulser. The relative strengths of the two pressure waves, the time delays between the two pressure waves, and the phases of the two pressure waves may be used to provide additional information for characterizing the received signals. Although strain-responsive transducers are preferred, alternatively, accelerometers or geophones may be mounted to the BOP and/or riser to detect the signals. For example, the strain in the BOP and/or riser results in small time varying displacements that may be detected by accelerometers or geophone that responds to velocity.

The strain-responsive transducers are preferably mounted at different locations along the riser 126 proximal the sea floor 124. Such mounting of the strain-responsive transducers at different locations along the riser 126 offers the potential to further improve the signal-to-noise ratio and further process the two pressure waves (i.e., the pressure wave that propagate in the annulus from the nozzles in the drill bit and the pressure wave that propagate in the inner bore of the drillstring). In particular, multiple strain-responsive transducers may be configured to cancel random noise by simple addition of the received signals, or by judicious phasing of the outputs of the sensors. This may be particularly applicable when considering the elimination of downward propagating noise (e.g., noise that originates from above the sea floor and propagates downward to the sea floor within the annulus) observed in a system with a negative pulser. Examples of suitable systems and methods for filtering noise are described in U.S. Pat. No. 4,590,593, which is hereby incorporated herein by reference in its entirety.

Figure 19:
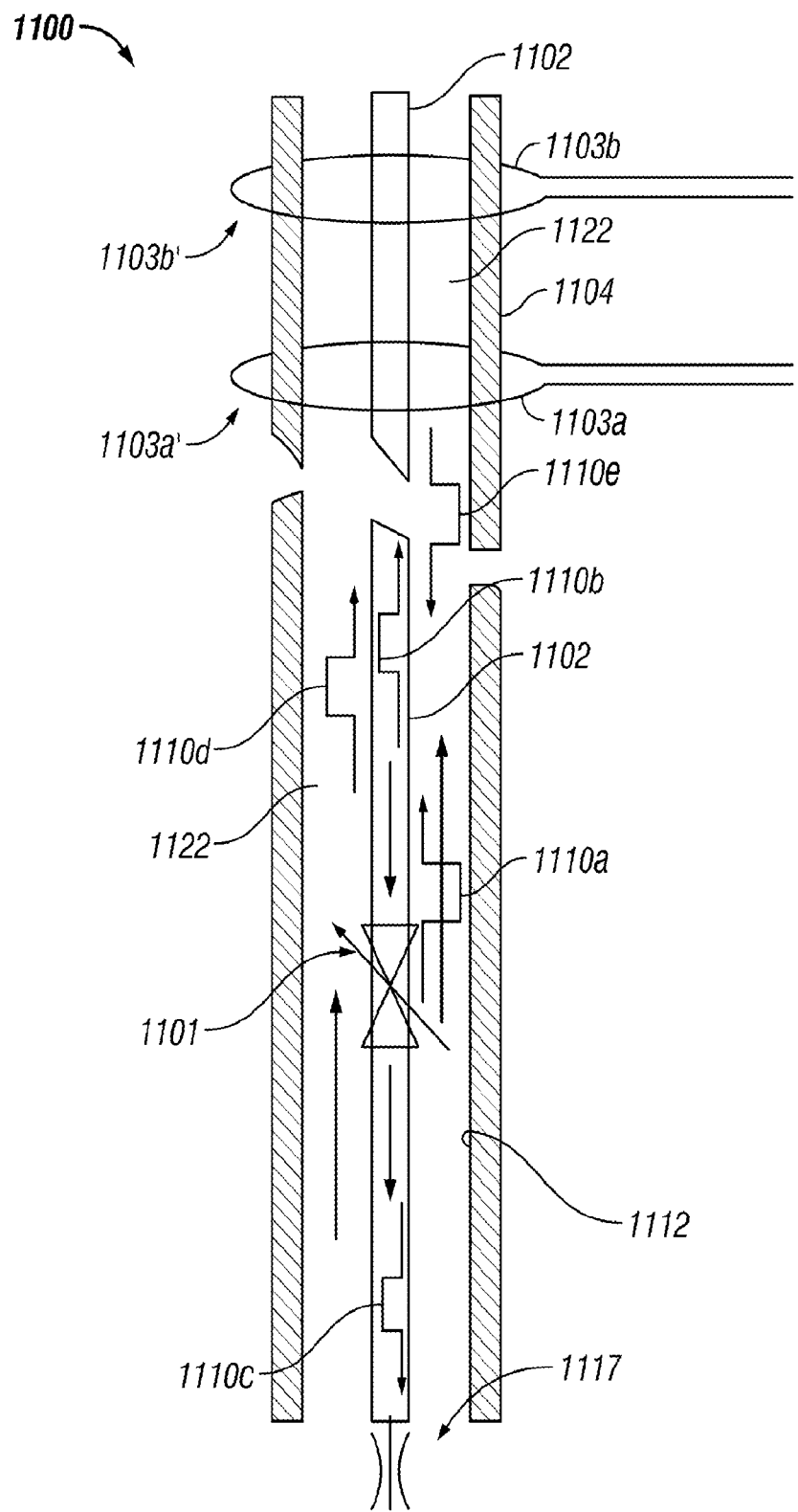
FIG. 19 is a schematic view of an embodiment of a mud pulse telemetry system that may be employed as telemetry communication uplink system of FIG. 2.

Referring now to FIG. 19, a schematic view of an embodiment of an uplink system 1100 that may be employed as telemetry communication uplink system 140 of FIG. 2 is shown. In this embodiment, uplink system 1100 is a mud pulse telemetry uplink system including a negative pulser 1101 disposed along the drillstring 1102 and a pair of pressure transducers 1103a, b disposed about a subsea riser 1104 proximal the sea floor (e.g., sea floor 124). When employed in drilling system 100 previously described, negative pulser 1101 functions as transmitter 143 and pressure transducers 1103a, b function as receivers 145. Drillstring 1102 extends through riser 1104 and a borehole 1112 being drilled by drill bit 1117. An annulus 1122 is disposed about drillstring 1102 within riser 1104 and borehole 1112.

Pressure transducers 1103a, b are disposed at different positions along riser 1104—first pressure transducer 1103a is disposed at a first position 1103a' along the riser 1104 and second pressure transducer 1103b is disposed at a second position 1103b' along the riser 1104 that is axially spaced above pressure transducer 1103a. Thus, pressure transducers 1103a, b detect pressure pulses within drillstring 1102 and annulus 1122 at positions 1103a', b', respectively. In this embodiment, each pressure transducers 1103a, b is a fiber optic pressure transducer as previously described with respect to FIG. 15 (i.e., fiber optic pressure transducer 900).

As previously described with respect to FIGS. 11 and 17, negative pulser 1101 generates (1) a positive pressure pulse 1110a propagating up annulus 1122 due to the momentary venting of the high pressure drilling fluid in drillstring 1102 into the lower pressure drilling fluid in annulus 1122; (2) a negative pressure pulse 1110b propagating up the inner bore of drillstring 1102 and a negative pressure pulse 1110c propagating down the inner bore of drillstring 1102 due to the momentary venting of the high pressure drilling fluid in drillstring 1102 into the lower pressure drilling fluid in annulus 1122; and (3) a negative pressure pulse 1110d propagating up annulus 1122 surrounding drillstring 1102 resulting from negative pressure pulse 1110c exiting drillstring 1102 through the drill bit nozzles and back up annulus 1122. In addition, a pressure pulse 1110e representing noise propagates downward through annulus 1122 from the surface.

Although pulse 1110*e* is shown as a positive pressure pulse, in general, noise traveling through the drilling fluid may be of either polarity.

As previously described, at least a portion of the pressure pulse propagating down the inner bore of the drillstring (e.g., negative pressure pulse 1110*c* propagating down inner bore of drillstring 1102) reflects off the drill bit (e.g., drill bit 1117) and propagates back up the inner bore of the drillstring. The reflected pressure pulse has the same polarity as the downward propagating pressure pulse. Thus, for negative pressure pulser 1101, a portion of negative pressure pulse 1110*b* reflects off drill bit 1117 and propagates back up the inner bore of drillstring 1117 as a negative pressure pulse. The reflected negative pressure pulse constructively interferes and reinforces negative pressure pulse 1110*b* traveling up the inner bore of drillstring 1102. Thus, as shown in FIG. 19, negative pressure pulse 1110*b* includes the reflected negative pressure pulse.

Figure 20:
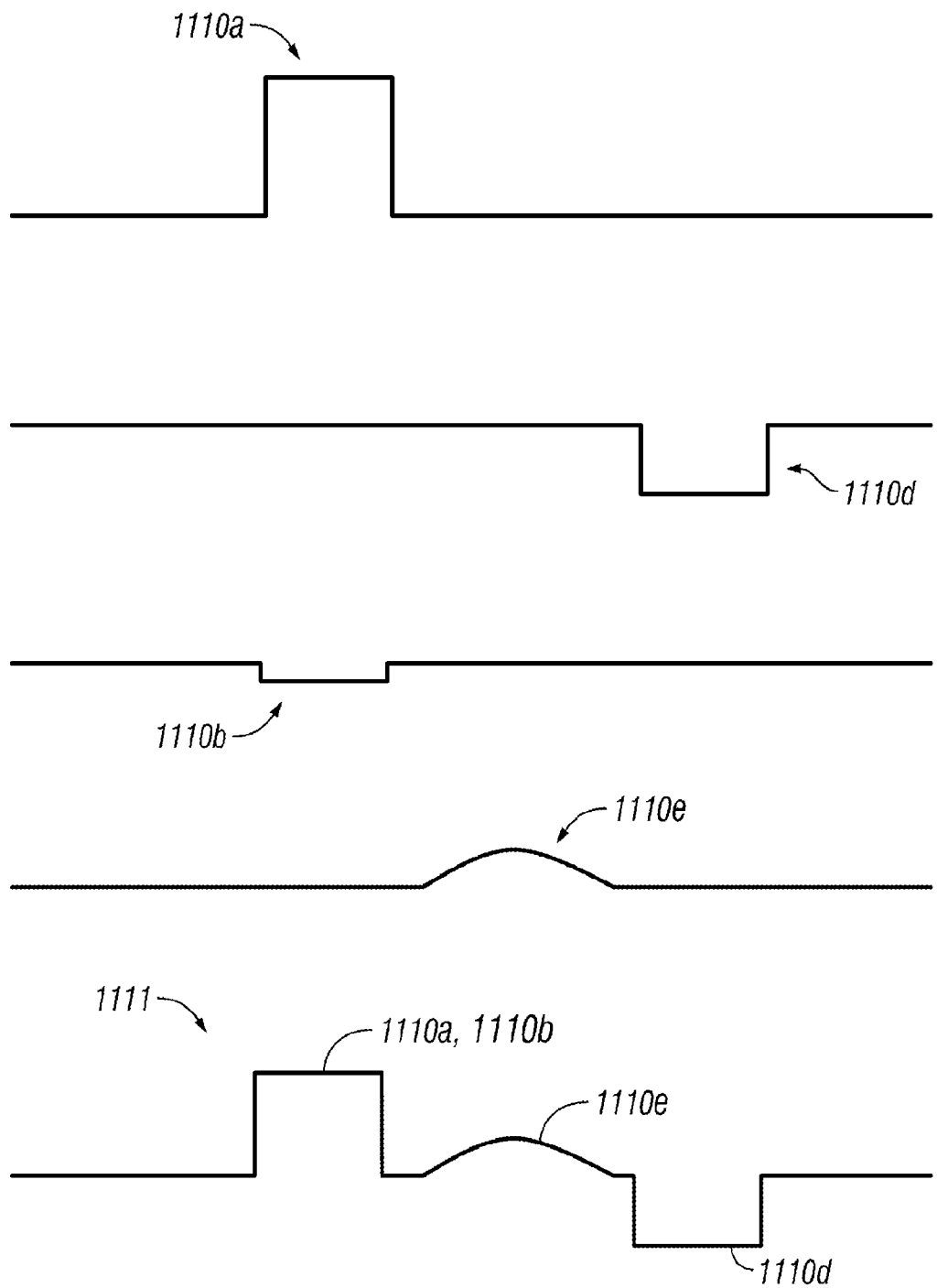
FIG. 20 schematically illustrates the pressure pulses received and detected by the first fiber optic pressure transducer of FIG. 19.
Figure 21:
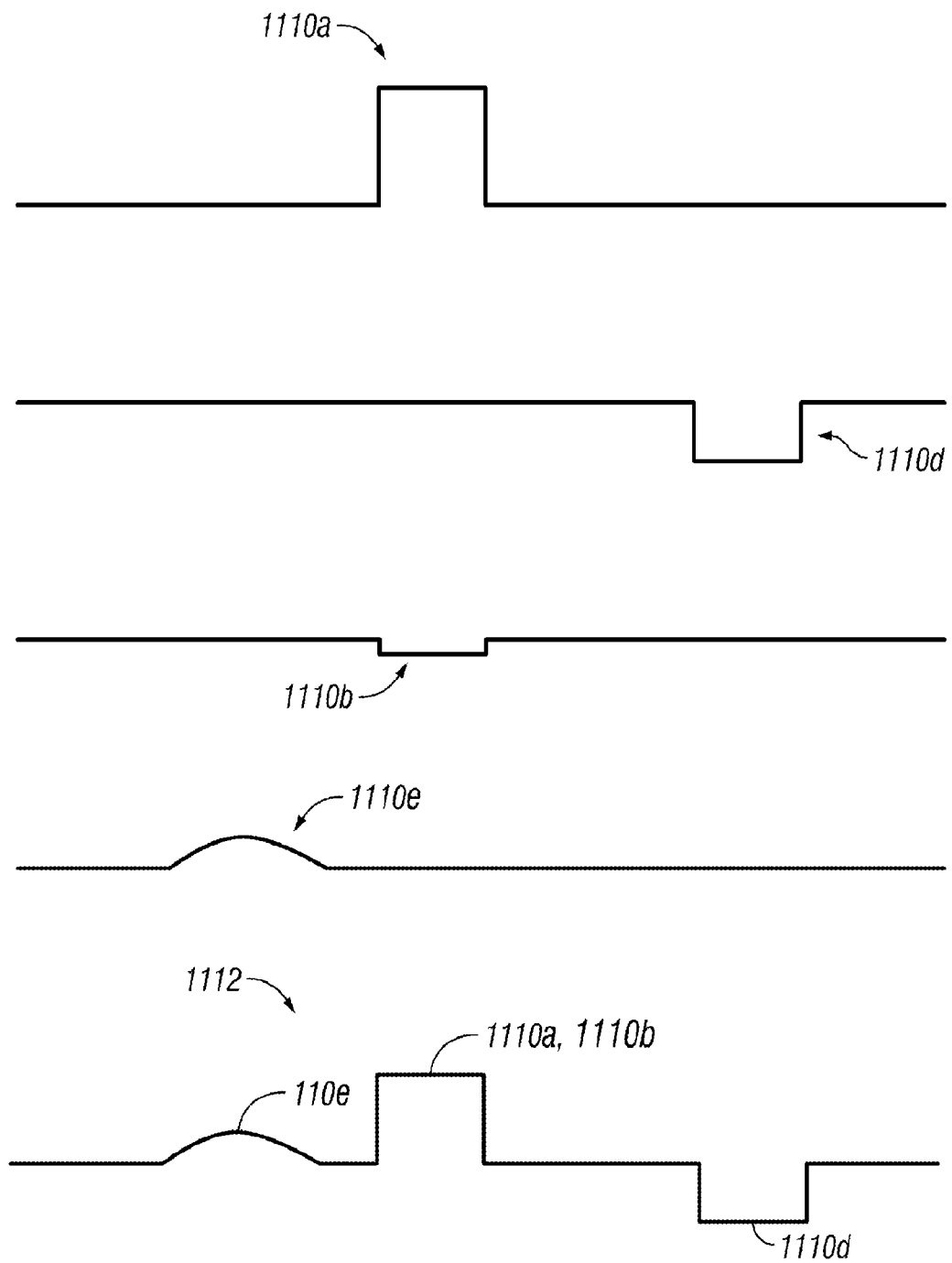
FIG. 21 schematically illustrates the pressure pulses received and detected by the second fiber optic pressure transducer of FIG. 19.
Figure 22:
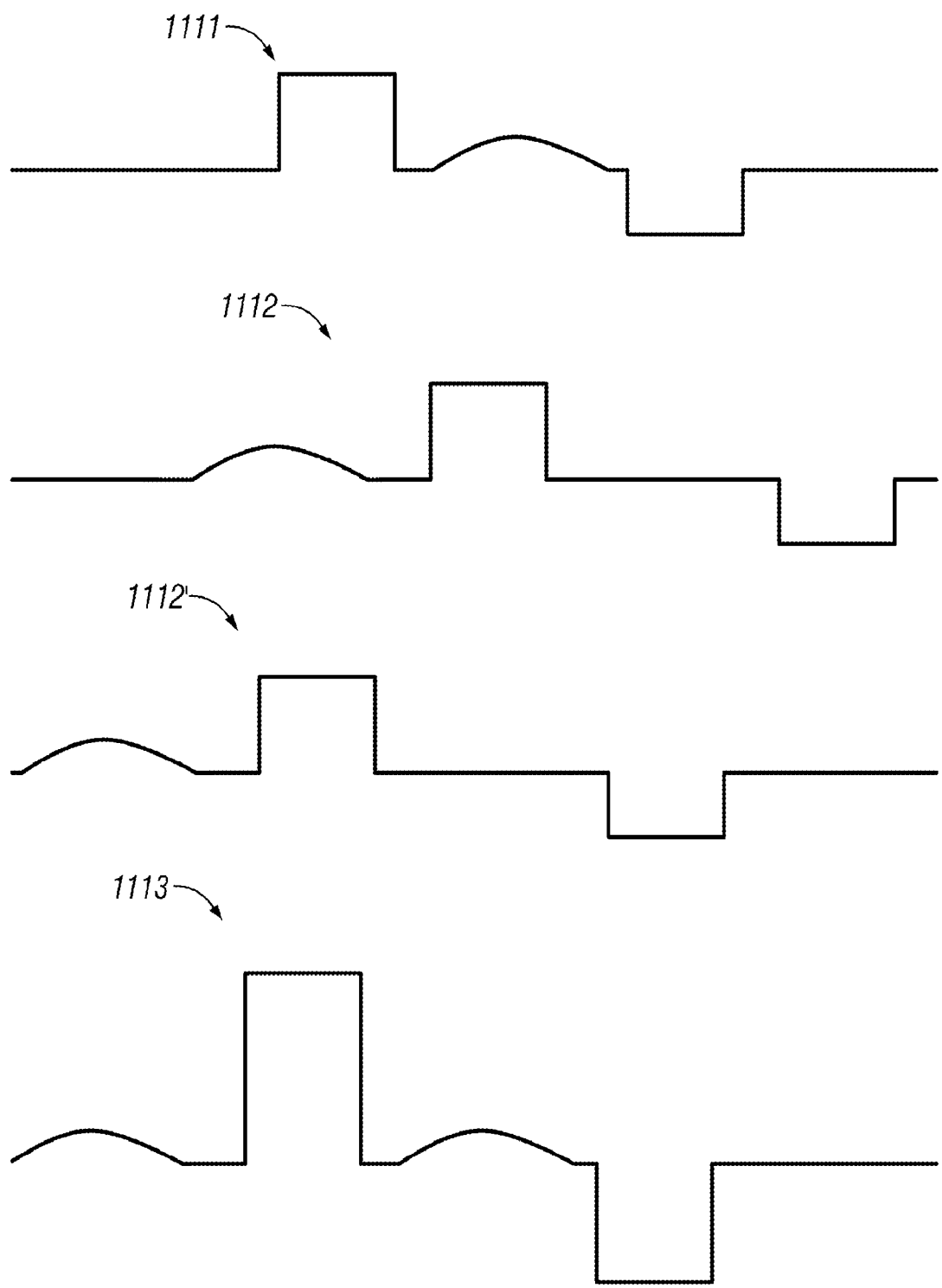
FIG. 22 schematically illustrates the summation of the pressure pulses of FIG. 20 and the phase-shifted pressure pulses of FIG. 21.

Referring now to FIGS. 20-22, the pressure pulses or signals detected at positions 1103*a'*, *b'* by pressure transducers 1103*a*, *b*, respectively, represent the summation of a plurality of individual pressure pulses. For example, as shown in FIG. 20, the pressure pulse 1111 detected by pressure transducer 1103*a* at first position 1103*a'* is the sum of the following individual pressure pulses propagating through the drilling fluid in drillstring 1102 and annulus 1122 between drillstring 1102 and riser 1104:

pressure pulse 1110*a*—the upward propagating positive pulse in annulus 1122;
pressure pulse 1110*d*—the upward propagating negative pulse in annulus 1122;
pressure pulse 1110*b*—the upward propagating negative pulse in drillstring 1102, including the reflected negative pressure pulse, induces strain in the drillstring that creates a pressure pulse in the annulus and associated strain in the riser; and
pressure pulse 1110*e*—the downward propagating pressure pulse in annulus arising 1122 from noise traveling through the drilling mud.

Negative pressure pulse 1110*d* is a generally a weaker signal than positive pressure pulse 1110*a*. Further, negative pressure pulse 1110*d* trails and is delayed from positive pressure pulse 1110*a* by a fixed amount due to fixed distance between negative pulser 1101 and drill bit 1117. Negative pressure pulse 1110*b* is also weaker than positive pressure pulse 1110*a*. However, negative pressure pulse 1110*b* is in-phase with positive pressure pulse 1110*a*, and thus, destructively interferes with positive pressure pulse 1110*a*.

Referring briefly to FIG. 21, the pressure pulses or signals 1112 detected by pressure transducer 1103*b* is the sum of the same individual pressure pulses 1110*a*, *b*, *d*, *e*, *f* but at second position 1103*b'*. Since pressure transducer 1103*b* is axially above pressure transducer 1103*a*, pressure pulses 1110*a*, *d* propagating upward through drillstring 1102 and pressure pulse 1110*b* propagating upward through annulus 1104 reach pressure transducer 1103*a* before pressure transducer 1103*b*. Thus, pressure transducer 1103*a* detects pressure pulses 1110*a*, *b*, *d* before pressure transducer 1103*b*. However, since pressure pulse 1110*e* propagates downward through annulus 1104, it reaches pressure transducer 1103*b* before pressure transducer 1103*a*. Thus, pressure transducer 1103*b* detects pressure pulse 1110*e* before pressure transducer 1103*a*.

Referring now to FIG. 22, pressure pulses 1111, 1112 detected by transducers 1103*a*, *b*, respectively, can be combined to enhance the observed signal relative to the noise. In one exemplary embodiment, pressure pulse 1112 measured by pressure transducer 1103*b* at second location 1103*b'* is back-shifted by the propagation delay (i.e., the time it takes pulses 1110*a*, *d*, *b* to travel from transducer 1103*a* to transducer 1103*b*) to generate a delay shifted pressure pulse 1112'. Delay shifted pressure pulse 1112' is then be added to pressure pulse 1111 measured by pressure transducer 1103*a* at first location 1103*a'*, resulting in a summation pressure pulse signal 1113 having an enhanced signal-to-noise ratio.

Although FIG. 19 and this signal processing procedure has been described with reference to two pressure transducers 1103*a*, *b* disposed at two different locations 1103*a'*, *b'*, it should be appreciated that more than two spaced-apart pressure transducers may also be employed to further enhance the signal-to-noise ratio in the manner previously described. It should also be appreciated that estimates of the noise may be calculated by adding the delay shifted pressure pulse 1112' from pressure pulse 1111. Additional methods for signal processing are described in U.S. Pat. No. 4,590,593, which is hereby incorporated herein by reference in its entirety. Further, it should be appreciated that methods for signal processing known in the art for conventional pressure measurements made at the earth's surface may also be employed.

Although the embodiment shown in FIG. 19 teaches the use of fiber optic pressure transducers 1103*a*, *b*, in other embodiments, accelerometers may be mounted at one or more locations on the riser (e.g., riser 126), the BOP (e.g., BOP 119), or casing to detect and measure vibrations induced by the pressure pulses. The outputs of the accelerometers would be processed in much the same way as the outputs of the fiber optic pressure sensors described above.

Referring again to FIG. 2, in the case of an acoustic telemetry uplink (i.e., telemetry communication uplink system 140 relies on acoustic telemetry), telemetry signal transmitter 143 preferably comprises an acoustic telemetry transmitter, and telemetry signal receivers 145 preferably comprises an acoustic telemetry receiver. Acoustic telemetry transmitters transmit telemetry signals in the form of acoustic vibrations in the tubing wall of drillstring (e.g., drillstring 115). stress waves are directly propagated along the drillstring for the purpose of communicating information (or alternatively, torsional waves may be induced in the drillstring). Consequently, acoustic telemetry receivers are traditionally coupled to the kelly at the platform (e.g., platform 111). However, in embodiments described herein that include a telemetry communication uplink system 140 that communicates information from the BHA to the sea floor 124, the array of acoustic telemetry receivers are preferably mounted to the riser 126 or BOP 110 proximal the sea floor 124. Without being limited by this or any particular theory, except at points of contact between the drillstring and the riser (or casing or BOP), the coupling of the acoustic signals between the drillstring 115 and the riser 126 are generally small, but may not be negligible. Thus, techniques very similar to those previously described for use with a mud pulse telemetry system may be used with acoustic telemetry.

L/MWD operations offshore poses numerous difficulties and often imposes severe restrictions on achievable data rate and/or depth range. However, with additional technology and relocation of portions of the system, the same factors that impose restrictions can serve to enhance data rate and/or depth range. In embodiments described herein, the additional technology consists of a high data rate communications link (e.g., sea floor-to-sea surface communication link 160) from the sea floor (e.g., sea floor 124) to the sea surface (e.g., sea surface 121), which may include, without limitation, a hard-wired communication from the surface to the sea floor along the riser and to the BOP, a seafloor acoustic modem, or a seafloor optical modem. Further, in embodiments described herein, portions of the telemetry communication system may be advantageously relocated to the seafloor such as the telemetry receivers used to detect the telemetry signals and the signal processing technology used with the telemetry signals.

Although this disclosure is primarily directed to uplink telemetry, it should be noted that portions of a downlink can advantageously be located on the seafloor. This is particularly true for an EM telemetry system in an offshore installation. Without being limited by this or any particular theory, seawater typically has a conductivity of around 4 mhos/meter and is highly attenuative of electromagnetic signals, even at frequencies of a few Hz. The downlink electronics can be housed in a pressure-proof housing and placed either on the sea floor (perhaps on part of the seafloor template), on the BOP or on the riser. On many offshore units, an electrical power and communications link exists between the deck of the platform and the BOP stack. By tapping into this, power can be provided for the downlink, and commands can be sent to the downlink from the deck of the platform. This can considerably improve the signal that is received downhole. In addition, since EM telemetry downlinks typically involve high levels of current (on the order of amperes), the hazards associated with the downlink are considerably reduced by having the downlink signal originate at the sea floor. Alternatively, a sea floor downlink can be powered using batteries that are serviced via an ROV or similar subsea unit.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A method for communicating data in an offshore data communication system, comprising:
   (a) measuring borehole telemetry data with a sensor disposed in a bottomhole assembly positioned below the sea floor in a subsea borehole, wherein the bottomhole assembly is disposed along a bottomhole portion of a drillstring extending from a sea surface through a subsea riser and into the subsea borehole;
   (b) transmitting the data by pressure pulses in a drilling fluid along the drillstring from the bottomhole assembly to a location just-above-sea floor level of the drillstring as a telemetry signal;
   (c) detecting the telemetry signal by measuring changes of a circumference of said riser proximate to the location just above sea floor level of the drillstring with a transducer positioned along an exterior surface of said riser;
   (d) processing the detected telemetry signal at a location proximate to the location just-above-sea floor level of the drillstring to produce a processed signal; and
   (e) transmitting the processed signal by transmitting a signal through the sea water from said location just above sea floor level of the drillstring to the sea surface to be received and forwarded in said offshore data communication system.

2. The method of claim 1, wherein (d) further comprises amplifying the telemetry signal.

3. The method of claim 2, wherein (d) further comprises time shifting the telemetry signal and filtering the telemetry signal.

4. The method of claim 1, further comprising controlling the processing of the telemetry signal with a signal processor positioned at said location proximate to the just-above-sea floor level of the drillstring to the sea floor.

5. The method of claim 1, further comprising transmitting the data by pressure pulses in the drilling fluid through an inner bore of said drillstring.

6. The method of claim 1, wherein (e) further comprises:
   communicating the processed telemetry signal to the sea surface with an acoustic modem including an acoustic modem transmitter disposed near the location just-above-sea floor level and an acoustic modem receiver disposed near the sea surface.

7. The method of claim 1, wherein (e) further comprises:
   communicating the processed signal through a wire extending along the riser from the location just-above-sea floor level to the sea surface.

8. The method of claim 1, wherein the transducer includes a strain-sensing transducer mounted to said exterior of said portion of said riser proximate to the sea floor.

9. The method of claim 1, wherein the transducer includes a fiber optic transducer wound about said exterior of said portion of said riser proximate to the sea floor.

10. The method of claim 1, wherein the transducer includes an accelerometer mounted to said exterior of said portion of said riser proximate to the sea floor.

11. The method of claim 1, wherein the transducer includes a geophone mounted to said exterior surface of said riser proximate to the location just-above-sea floor level.

12. The method of claim 1, further comprising
   disposing an array of transducers along said exterior surface of said riser; and
   detecting the telemetry signal by measuring changes of the circumference of said riser at a plurality of locations along said riser by said array of transducers.

13. An offshore drilling system, comprising:
   a drilling platform positioned at a sea surface;
   riser disposed between the drilling platform and a subsea borehole;
   a drillstring extending from the drilling platform through the riser and into the subsea borehole, the drillstring having a lower end including a bottomhole assembly along a bottomhole portion of said drillstring;
   a subsea telemetry communication system including a mud pulse telemetry transmitter disposed in the bottomhole assembly and a transducer disposed on an exterior surface of the riser at a location just-above-sea floor level and configured to detect changes in circumference of the riser as a telemetry signal indicative of pressure pulses generated by the mud pulse transmitter;
   a subsea signal processor positioned proximate to the location just-above-sea floor level and coupled to the telemetry transducer, wherein the signal processor is adapted to process the detected telemetry signal into a processed telemetry signal; and
   a communication link adapted to communicate the processed telemetry signal from the signal processor to the drilling platform, by transmitting the processed telemetry signal through the sea water to the sea surface to be received and forwarded in said offshore drilling system.

14. The system of claim 13, wherein the signal processor comprises:
   a housing including an input connector and an output connector, wherein the input connector is coupled to the transducer and the output connector is coupled to a transmitter of the communication link; and an amplifier disposed within the housing and coupled to the input connector and the output connector, wherein the amplifier is adapted to receive the telemetry signal from the input connector and amplify the telemetry signal.

15. The system of claim 14, wherein the signal processor further comprises:

a programmable delay line coupled to the amplifier, wherein the programmable delay line is adapted to receive the telemetry signal from the amplifier and phase shift the telemetry signal;

a programmable filter coupled to the programmable delay line, wherein the programmable filter is adapted to receive the telemetry signal from the programmable delay line and filter telemetry signal.

16. The system of claim 13, wherein the subsea telemetry communication system includes a plurality of transducers disposed along the exterior surface of the riser.

17. The system of claim 16, wherein the plurality of transducers includes a plurality of fiber optic pressure transducers wound about the exterior surface of the riser.

18. The system of claim 16, wherein the plurality of transducers are arranged in a vertical array along the riser.

19. The system of claim 13, wherein the communication link includes an acoustic modem transmitter and an acoustic modem receiver.

20. The system of claim 16, wherein the signal processor comprises:

a housing having a plurality of input connectors and an output connector, wherein each of said plurality of transducers is coupled to a different input connector;

a plurality of amplifiers disposed in the housing, wherein one amplifier is coupled to each input connector;

a plurality of programmable delay lines, wherein one delay line is coupled to each amplifier;

a plurality of programmable filters, wherein one filter is coupled to each delay line; and a computer adapted to control the programmable delay lines and the programmable filters.

21. The system of claim 20, wherein the signal processor further comprises a multiplexer coupled to the computer, each programmable filter, and the output connector; and wherein the output connector is coupled to the the communication link.

22. The system of claim 16, wherein the plurality of transducers includes a plurality of strain-sensing transducers mounted to the exterior surface of the riser.

23. The system of claim 16, wherein the plurality of transducers includes a plurality of accelerometers mounted to the exterior surface of the riser.

24. The system of claim 16, wherein the plurality of transducers includes a plurality of geophones mounted to the exterior surface of the riser.

* * * * *